(12) United States Patent
Farris et al.

(10) Patent No.: US 6,829,332 B2
(45) Date of Patent: Dec. 7, 2004

(54) PERSONAL DIAL TONE SERVICE WITH PERSONALIZED CALL WAITING

(75) Inventors: Robert D. Farris, Sterling, VA (US); Alexander I. McAllister, Silver Spring, MD (US); Michael J. Strauss, Potomac, MD (US)

(73) Assignee: Verizon Services Corp., Arlington, VA (US)

(*) Notice: Subject to any disclaimer, the term of this patent is extended or adjusted under 35 U.S.C. 154(b) by 321 days.

(21) Appl. No.: 10/124,659

(22) Filed: Apr. 17, 2002

(65) Prior Publication Data

US 2002/0163999 A1 Nov. 7, 2002

Related U.S. Application Data

(63) Continuation of application No. 09/094,725, filed on Jun. 15, 1998, now Pat. No. 6,404,858, which is a continuation-in-part of application No. 09/006,003, filed on Jan. 12, 1998, now Pat. No. 6,167,119, and a continuation-in-part of application No. 08/904,936, filed on Aug. 1, 1997, now Pat. No. 6,038,305, and a continuation-in-part of application No. 08/828,959, filed on Mar. 28, 1997, now Pat. No. 5,978,450.

(51) Int. Cl.[7] .............................................. H04M 1/64
(52) U.S. Cl. ............................ 379/88.02; 379/88.19; 379/201.02; 379/373.02
(58) Field of Search ........................... 379/88.01–88.04, 379/88.12, 88.16, 164, 179, 93.35, 201.01–201.03, 207.02, 211.01–211.04, 215.01, 216.01, 373.01, 373.03, 374.01, 374.02

(56) References Cited

U.S. PATENT DOCUMENTS

| | | | |
|---|---|---|---|
| 4,313,035 A | 1/1982 | Jordan et al. | |
| 4,371,752 A | 2/1983 | Matthews et al. | |
| 4,551,581 A | 11/1985 | Doughty | |
| 4,582,956 A | 4/1986 | Doughty | |
| 4,585,906 A | 4/1986 | Matthews et al. | |
| 4,602,129 A | 7/1986 | Matthews et al. | |
| 4,625,081 A | 11/1986 | Lotto et al. | |
| 4,661,975 A | 4/1987 | Brecher | |

(List continued on next page.)

OTHER PUBLICATIONS

"LSSGR, LATA Switching System Systems Generic Requirements, CLASS Feature: Call Waiting Deluxe," FSD 01–02–1215, Technical Reference TR–NWT–000416, Issue 2, Aug. 1993. Published by Bell Communication Research.

*Primary Examiner*—Roland G Foster
(74) *Attorney, Agent, or Firm*—Leonard C. Suchtya, Esq.; Joel Wall, Esq.; Rader, Fishman & Graue PLLC

(57) ABSTRACT

An intelligent telephone network provides personalized communication services based on a voice identification of the subscriber. Specifically, when a person requests a service, the network executes a speech processing operation, to identify the person or a party that the person is calling as a known subscriber. One or more switching offices of the network utilize profile data associated with the identified subscriber to control services. The personalized service applies both to incoming and outgoing calls. The network can provide the personalized services to several subscribers sharing a common line. For incoming calls to such a line, the network executes an interactive procedure to determine from the caller which subscriber she is calling. If the line is free, the switch applies distinctive ringing. If the line is in use, the switch uses the profile of the identified subscriber to provide a distinctive call waiting tone or a voice message over the line. The tone or voice message indicates to the party using the line that there is a call waiting and specifically identifies the called subscriber. For outgoing calls, the network utilizes a voice verification procedure to identify the actual subscriber. The subscriber's profile controls network processing of the call, including the provision of personal subscriber identification for caller ID, both on ringing calls and with call waiting alert signals.

26 Claims, 10 Drawing Sheets

U.S. PATENT DOCUMENTS

| | | |
|---|---|---|
| 4,759,056 A | 7/1988 | Akiyama |
| 4,843,377 A | 6/1989 | Fuller et al. |
| 4,899,373 A | 2/1990 | Lee et al. |
| 4,961,217 A | 10/1990 | Akiyama |
| 5,170,426 A | 12/1992 | D'Alessio et al. |
| 5,206,899 A | 4/1993 | Gupta et al. |
| 5,247,571 A | 9/1993 | Kay et al. |
| 5,263,084 A | 11/1993 | Chaput et al. |
| 5,309,512 A | 5/1994 | Blackmon et al. |
| 5,327,578 A | 7/1994 | Breeden et al. |
| RE34,735 E | 9/1994 | Tsaul et al. |
| 5,422,936 A | 6/1995 | Atwell |
| 5,430,791 A | 7/1995 | Feit et al. |
| 5,465,290 A | 11/1995 | Hampton et al. |
| 5,515,426 A | 5/1996 | Yacenda et al. |
| 5,572,583 A | 11/1996 | Wheeler, Jr. et al. |
| 5,586,177 A | 12/1996 | Farris et al. |
| 5,636,269 A | 6/1997 | Eisdorfer |
| 5,661,782 A | 8/1997 | Bartholomew et al. |
| 5,661,791 A | 8/1997 | Parker |
| 5,719,921 A | 2/1998 | Vysotsky et al. |
| 5,761,290 A | 6/1998 | Farris et al. |
| 5,825,865 A | 10/1998 | Oberlander et al. |
| 6,404,858 B1 * | 6/2002 | Farris et al. ............ 379/88.02 |

* cited by examiner

PERSONAL DIAL TONE SERVICE WITH PERSONALIZED CALL WAITING

REFERENCE TO RELATED APPLICATIONS

This application is a continuation of U.S. Ser. No. 09/094,725 filed Jun. 15, 1998, (Now U.S. Pat. No. 6,404,858 B1).

CROSS-REFERENCE TO RELATED APPLICATION

This application is a continuation-in-part of U.S. patent application Ser. No. 08/828,959 filed Mar. 28, 1997, now U.S. Pat. No. 5,978,450, and a continuation-in-part of U.S. patent application Ser. No. 08/904,936 filed Aug. 1, 1997, now U.S. Pat. No. 6,038,305, and of U.S. patent application Ser. No. 09/006,033 filed Jan. 12, 1998, now U.S. Pat. No. 6,167,119 the disclosures of which are expressly incorporated herein entirely by reference.

TECHNICAL FIELD

The present invention relates to personalized telecommunications services, preferably offered through an intelligent telephone network, and to such a service providing personalized call waiting. The personalized call waiting service may personalize the waiting tone to the called subscriber and/or personalize the identification of the caller if provided with the call waiting signal.

ACRONYMS

The written description uses a large number of acronyms to refer to various services, messages and system components. Although generally known, use of several of these acronyms is not strictly standardized in the art. For purposes of this discussion, acronyms therefore will be defined as follows:
Address Complete Message (ACM)
Advanced Intelligent Network (AIN)
Analog Display Services Interface (ADSI)
Answer Message (ANM)
Automatic Number Identification (ANI)
Call Processing Record (CPR)
Call Waiting (CW)
Central Office (CO)
Common Channel Interoffice Signalling (CCIS)
Common Channel Signaling (CCS)
Customer Premises Equipment (CPE)
Data and Reporting System (DRS)
Destination Point Code (DPC)
Dual Tone MultiFrequency (DTMF)
Frequency Shift Key (FSK) data modulation
Generic Data Interface (GDI)
Initial Address Message (IAM)
Integrated Service Control Point (ISCP)
Integrated Services Digital Network (ISDN)
ISDN User Part (ISDN-UP)
Intelligent Peripheral (IP)
Line Identification Data Base (LIDB)
Multi-Services Application Platform (MSAP)
Office Equipment (OE)
Origination Point Code (OPC)
Personal Communications Service (PCS)
Personal Identification Number (PIN)
Plain Old Telephone Service (POTS)
Point in Call (PIC)
Primary Rate Interface (PRI)
Public Switched Telephone Network (PSTN)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)
Trunk (TR)

BACKGROUND ART

Telephone service has become virtually ubiquitous throughout the modern world. A person can simply take a telephone off-hook, dial a destination telephone number, and if someone answers the called telephone, the caller can converse with another party anywhere in the world.

Today, however, the public switched telephone network (PSTN) and other telephone networks such as cellular systems provide most telephone services based on number identification of the telephone set or line that each party uses. Services are personalized only to the extent that a party uses the same line and/or instrument. For example, a person typically has one set of service features and billing options available via a telephone on the person's desk at the office, another set of service features and billing options available via the telephone line to their home and perhaps a third set of service features and billing options available via a wireless telephone (e.g. cellular or personal communications service (PCS)). The networks process calls to and from each of these different subscriber telephones based on a separate telephone number. A caller may use personalized billing options by using a calling card, but often the input operations for calling card service are overly complex. With the exception of calling card billing, each person using a particular telephone typically can only access those service features and billing options associated with the particular line or telephone instrument.

The proliferation of services causes subscribers inconvenience. For example, circumstances arise in which a subscriber may want a feature or billing option normally associated with one line or instrument, such as the office telephone, when they are in fact using a different line or instrument such as their home or PCS telephone. Alternatively, two or more persons using one telephone or line often want different sets of service options. Also, the extreme increase in demand for telephone services is rapidly exhausting the capacity of the network, particularly in terms of the telephone numbers available under the current numbering plan.

A number of specific solutions have been proposed for individual problems, such as work at home and/or transfer of service to new location(s) as an individual travels. However, each of these solutions is limited or creates its own new problems.

For example, U.S. Pat. No. 4,313,035 to Jordan et al. discloses a method of using an intelligent network to provide a 'follow-me' type service through multiple exchanges of the switched telephone network using an AIN type of telephone system architecture. Each subscriber to the locator service has a unique person locator telephone number. To access the system to update data in a service control database, the subscriber dials 0700 and his unique person locator telephone number. The telephone switching office routes the call to a traffic service position system (TSPS) which prompts the caller (e.g. provides an additional dial tone) and receives further digits from the subscriber. The subscriber inputs a three digit access code, indicating the type of update call, and a four digit personal identification number. If calling from the remote station to which the subscriber wishes his calls routed, the local switching office forwards the line identification number of that station to the TSPS. The TSPS forwards the dialed information and the line identification to the data base for updating the particular subscriber's location record. A caller wishing to reach the subscriber dials the subscriber's unique person locator number. A telephone switching office sends the dialed number to the central database. The database retrieves the stored completion number for the called subscriber and forwards that number back to the switching office to complete the call.

The Jordan et al. approach allows calls to follow the subscriber to each new location, but the subscriber must have a unique telephone number for this service. Each station that receives a call also must have a unique telephone number. As such, the Jordan et al. approach actually exacerbates the shortage of telephone numbers. Also, Jordan et al. rely on subscriber input of identification numbers. Subscribers often find this inconvenient, and this technique is often prone to number entry errors.

U.S. Pat. No. 4,899,373 to Lee et al. discloses a system for providing special telephone services to a customer on a personal basis, when the customer is away from his or her home base or office. The personalized services are provided in a multiple exchange office environment, using a central database for feature control. The nationally accessible central database system stores feature data in association with personal identification numbers. A subscriber wishing to use his personalized features while away from home base dials a special code and presents the personal identification number. The exchange transmits a query to the central database, and the corresponding feature data is retrieved from the database. The database forwards the feature data to the exchange, and the exchange stores the received feature data in association with the station from which the request was initiated. Subsequently, the exchange accesses the downloaded feature data to provide telephone service corresponding to the subscriber's personalized telephone features via the station the subscriber is currently operating from. A temporary office arrangement may be established in which the personalized features will be immediately available on incoming and outgoing calls for a period of time specified by the subscriber.

U.S. Pat. No. 5,206,899 to Gupta et al. pertains to a system wherein a subscriber can assign desired characteristics to any "target station" which is an active telephone accessible to a telecommunications network. A call thereafter that originates from the target station can use customized features, such as account code dialing and corporate billing arrangements. Initially, a service profile is created and stored for each subscriber and contains information describing desired features and billing options. The characteristics of a particular target station are changed by an activation process that can be initiated from any location. Automatic number identification (ANI) information associated with the target station is entered into an ANI trigger table in an intelligent switch, and the service profile is loaded into a database. When a call originates from the target station, information in the database is applied to the switch to provide the desired characteristics. An example of one of the features is when an employee of company X wishes to make business related calls from his/her telephone, the call has the characteristics of a call made from the office by a special billing arrangement.

Like Jordan, the Lee et al. and Gupta et al. systems depend on a dialed number entry by the subscriber to activate the service. Also, the Lee et al. and Gupta et al. systems do not provide a simple manner for more than one subscriber to obtain personalized service over the same telephone line. In Lee et al., during the period when the switch stores the roaming subscriber's profile in association with the line, all calls are processed based on that one profile. Similarly, in Gupta et al., while the ANI trigger is set against the line, all outgoing calls cause database access and use of the subscriber's profile in the database. There is no way to fall back on the normal profile for that line unless and until the service for the roaming subscriber is cancelled with respect to that one line.

U.S. Pat. No. 5,247,571 to Kay et al. discloses an Area Wide Centrex service provided by an advanced intelligent telephone network. The service provides centrex features, such as extension dialing, to multiple locations. The Kay et al. patent also suggests a Work-at-Home feature. This feature allows the home telephone line to selectively operate as a residential line or as a Centrex business line, on a call-by-call basis. For a business call, the user would preface the call with an access indicator to identify a business call. When an outgoing call from the home line lacks the access indicator, the network processes the call as a standard residential call.

The Work-at-Home feature in the Kay et al. system requires only dialing of a code before each outgoing business call. However, the Kay et al. approach requires that the business profile is stored in association with the home line before the subscriber makes the call. The subscriber can use the Centrex billing and service features from the business account only from a home telephone previously associated with the business line. The subscriber can not use the billing and service features from the business account from any randomly selected telephone. Also, from the home line, a person can either use the normal residential profile service or the pre-defined business profile service. There is insufficient flexibility to enable a wider range of services for multiple subscribers through the one line.

Two increasingly popular telephone services are distinctive ringing and call waiting. At least certain implementations of these services provide some limited customer related information, but only based on called or calling party telephone numbers.

Distinctive ringing allows a customer to have more than one telephone number assigned to that customer's line for incoming calls, and the network provides a different ringing signal over the line for each incoming call depending on which of the subscriber's numbers was dialed. Consider an example in which a family has one line with two numbers and a distinctive ringing service. The first number is used for the family as a whole, and the second number is used for a teenage son or daughter. The distinctive ringing allows people in the household to know whether or not each incoming call is for the teenager. The incoming calls are personalized to individuals in the residence, but the telephone network must assign two or more numbers to the one line. Telephone numbers are an increasingly scarce resource.

Basic call waiting service informs a user of a called party station engaged on an existing call of the presence of a waiting, incoming call. With this service, the end office switch providing telephone service to the called party's station typically applies an audible tone burst to that party's line. The service provides the user with options for terminating the existing call and answering the waiting call or placing the existing call on hold to answer the waiting call. Of course, the user may simply ignore the call waiting tone and allow the waiting call to go unanswered.

Call waiting services have been personalized, to some extent. For example, U.S. Pat. No. 5,636,269 to Eisdorfer discloses a methodology for using information about a calling party's identity or the importance of a call to control the call waiting signal played to a called party that is busy on another call. The network routes the secondary incoming call to an intelligent processor, which interacts with the caller to obtain identity related information or an indication of the caller's perception of the importance of the call. The call waiting process and signaling to the subscriber is then controlled in accord with the identity or importance signified by the caller. For example, in one embodiment, the network provides a distinctive call-waiting signal over the subscriber's line, based on information about the identity of the calling party. This type of approach does provide added information about the caller to the called subscriber, but the distinctive tone can identify only a limited number of calling parties. Also, the called subscriber must remember to associate the tone sequence with a particular caller, whom the subscriber may not receive calls from often. In that sense, the personalization to individual callers is limited at best. Also, there is no distinction or personalization to different parties who may use the called station.

As another example of enhancements to call waiting, a number of the telephone carriers, including the regional Bell operating companies (RBOCs), have deployed a switched based service feature identified as 'Call Waiting Deluxe'. The 'Deluxe' service enables the called party to select one of an enlarged set of call dispositions, by activating telephone keys or by activation of an intelligent display type telephone. Also, if the 'Deluxe' service subscriber has a calling identity delivery service and an appropriate terminal, the switch provides caller ID with the call waiting tone. In this way, the incoming or waiting call is personalized to the individual caller. However, this personalization is only based on the telephone number of the calling station or line, and there is no delivery of any information regarding the actual waiting caller's personal identity. If name information is provided, it is the name identified with the calling telephone number for billing purposes, which may or may not be the name of the caller, as discussed more later. A more detailed description of the Call Waiting Deluxe feature is available in Bell Communication Research, "LSSGR, LATA Switching Systems Generic Requirements, CLASS Feature: Call Waiting Deluxe," FSD 01-02-1215, Technical Reference TR-NWT-000416, Issue 2, Aug. 1993.

If a subscriber has both distinctive ringing and call waiting, the telephone networks can provide a distinctive call waiting tone, particularly in carrier networks supporting the 'Deluxe' call waiting feature (see for example the above cited LSSGR document, at pages 43-44). Specifically, the program controlled switch serving the subscriber may apply a variable tone. The normal call waiting signal is a 440 Hz tone applied to the line for 300±50 ms. For distinctive alerting, the switch may vary this tone by using one or more interruption patterns, for example 150 ms on, followed by 150 ms off, followed by another 150 ms on, etc. Other patterns may be used. Alternatively, the switch may apply alerting tones of distinctively different audio frequencies and/or vary the tone frequency during transmission to the user. The distinctive alerting, for multiple number called subscriber lines, does personalize the waiting signaling to some extent. However, like distinctive ringing, this personalization requires assignment of multiple telephone numbers to the one line, and thus uses up a scarce network resource.

Another popular telephone service is caller identification or 'caller ID'. The telephone network identifies the telephone number associated with the line or instrument used by the calling party and supplies the telephone number to a display device at the called customer's premises.

Subscribers having ISDN service receive caller ID data, for display at the time of an incoming call, in the form of a data message which the end office switch transmits over the D-channel. For analog telephone customers, however, existing caller ID utilizes in-band transmission technology similar to that described in U.S. Pat. Nos. 4,582,956 and 4,551, 581 to Doughty. In such an analog system, the end office switch connected to the called party's line transmits directory number data for the calling party's telephone line as frequency shift keyed (FSK) data inserted in the silent interval between ringing signal pulses applied to the called party's line. The receiving apparatus includes a line interface unit, a converter, a control circuit and a display unit. A frequency shift keyed (FSK) signal representing the special service information is filtered from the ringing signals by the line interface unit. The converter detects the FSK signal and demodulates the special service information from the FSK signal. Following detection of the FSK signal, the control circuit receives and stores the special service information. The stored information is periodically sent to the display unit to begin exhibiting thereof during the silent interval before the next ringing signal.

The local telephone exchange carriers have recently begun offering an enhanced form of caller ID, sometimes referred to as 'Caller ID Deluxe' service. This enhanced service utilizes AIN type call processing to access a Line Information Database (LIDB) to translate the calling party's directory number into name data. The end office switch forwards the name data and the normal caller ID telephone number as FSK encoded data inserted in the silent intervals between ringing signals.

The LIDB database includes a single listing for each telephone line and translates each number into a single name, typically the name of the party identified as the customer or subscriber for billing purposes. In fact, the LIDB database provides this single translation even for calls from one line having multiple telephone numbers. Consider an example in which a family has one line with two numbers and a distinctive ringing service. The first number is used for the family as a whole, and the second number is used for a teenage son or daughter. The distinctive ringing allows people in the household to know whether or not each incoming call is for the teenager. On outgoing calls, however, the end office switch always identifies the line by the primary number (the family's number), and the LIDB database always provides the name of the billing subscriber, e.g. the father's name. As a result, when the teenager calls a friend, the friend will receive the main number and possibly the father's name, for both caller ID service and for any call waiting type service having a caller ID feature. If the friend calls back using the information from his caller ID display terminal, the friend calls the family's main number, not the teenager's number.

The above discussed examples of prior suggestions to personalize services have not adapted the caller identification to correspond to the actual party using the telephone on the outgoing call. For example, in a system like that of Lee, Gupta or Kay, the caller might use features and billing options associated with her personalized or work service, but any such calls would produce a caller ID display identifying the number of the station from which she originated the call. If the called party subscribed to the name type enhanced caller ID or a corresponding 'Deluxe' call waiting service with display, the network would provide a name associated with that telephone number, not the name of the actual calling party.

U.S. Pat. Nos. 4,961,217 and 4,759,056 proposed a card based system for providing personalized features, including caller name display. Each user has a "portable memory device" in the form of an identification card bearing personal information including identification information. When initiating a call, the user inserts the card in the calling station, and information from the card is transmitted to the central switching system. In one embodiment, the switching system translates the identification information from the card to produce a textual representation of the calling party's name and transmits that information to a called terminal for display. Although this system does provide a name display identifying the actual called party, the system requires the use of the identification card and specialized calling terminals for reading the information from the cards.

As shown by the above discussion, a need still exists for an effective technique to personalize telephone service features, particularly as they relate to call waiting. The service should be personalized, to allow distinctive alerting for multiple called parties using a particular link or station, without the need to assign more than one number to the particular link or station. The call waiting service also should be personalized for calling parties, to provide actual subscriber identification for caller ID, not just number or name information associated with the calling station or line.

DISCLOSURE OF THE INVENTION

The present invention addresses the above noted problems and provides advances over the existing technology by personalizing telecommunication services, particularly services relating to call waiting, based on an identification of an actual subscriber. If the subscriber is the called party, the personalized service provides a distinctive alerting signal, for example, a distinctive ringing or indicating a waiting call for the particular subscriber. If the subscriber is the calling party, the personalized service provides specific personal information, such as a name or number and code, specifically associated with the identified subscriber.

On calls from the subscriber, the personalized services of the present invention rely on speech authenticated identification of the actual calling subscriber. On incoming calls, the services rely on a voice response unit type functionality, preferably utilizing speech recognition, to identify the actual called subscriber. Offices of a communication network utilize profile data associated with the identified subscriber, rather than profile data associated with a particular telephone number or a particular communication link. In many of the preferred service applications, the network uses a virtual office equipment number assigned to the subscriber's profile data to retrieve the data for providing a requested service, reducing or eliminating the need for assignment of additional telephone numbers. The network uses at least some data identifying the specific subscriber from the profile, e.g., to facilitate subscriber specific caller identification or subscriber specific alerting for ringing or for call waiting signals.

Thus, one aspect of the invention relates to a method involving detecting a call to a predetermined destination identifier. The identifier is associated with a number of known individual subscribers. In response to the detected call, the method provides a prompt to a caller, and analyzes an input from the caller. The prompt and input analysis enables identification of one of the known subscribers as an individual intended as a recipient of the detected call. Profile information, corresponding to the intended recipient subscriber, is loaded into a call processing register of a switch serving a link to a destination station corresponding to the identifier. There are a number of predetermined call alert signals. The method involves sending a distinct one of these alert signals, identifying the intended recipient subscriber, over the link to the destination station. The preferred embodiments of this method provide distinctive ringing signals identifying called subscribers and/or distinctive call waiting signals to identify called subscribers.

In the disclosed embodiments, the one identifier is a single telephone number. Two or more subscribers share a telephone number for incoming calls. Upon identification of one of the subscribers as the intended recipient for the particular call, the intelligent telephone network utilizes a virtual office equipment number to retrieve a profile, corresponding to the intended recipient. The network uses this profile as the terminating subscriber profile, to process the call to the destination. In particular, the profile provides the information necessary to apply the appropriate type of distinctive alerting signal.

Another aspect of the invention relates to an apparatus, including a telecommunication network and a platform, for providing a distinctive alerting type communication service. The telecommunication network includes central office switching systems, interconnected by trunk circuits, for processing calls originated over various communication links. At least one of the switching systems has a mass storage, which contains subscriber profiles. The platform is coupled via a communication link to one of the central office switching systems. The platform provides a message to a caller and receives an input from the caller. In response to a call to the destination identifier, the network routes the call to the platform. The platform prompts the caller and analyzes a caller's input, to identify one subscriber as the intended recipient of the particular call. Upon identifying the intended recipient subscriber, the platform provides a code corresponding to that subscriber to a central office switching system serving a link corresponding to the destination identifier. In the preferred embodiments, the code is a virtual office equipment number. The switching system utilizes profile information, corresponding to the intended recipient subscriber, to process the call. In particular, that system transmits the distinct alerting signal for that subscriber over the link to the destination.

The preferred embodiments of this network take the form of an advanced intelligent network implementation of the public switched telephone network. The switching systems are central office telephone switches. The platform typically is an intelligent peripheral. The network includes a signaling network and a service control point. The network may include an additional data network, for communications between the service control point and the intelligent peripheral.

Other aspects of the invention relate to methods and systems for providing personalized caller ID types of information, personal to the individual caller, on incoming calls, particularly waiting incoming calls. One such aspect of the invention relates to a method which begins with the detection of a request for a communication service, from a first communication link to a second link, through a communication network. The calling party is identified as one of the subscribers associated with the first link. The method then uses a virtual office equipment number, assigned to the identified subscriber, to retrieve corresponding profile data from stored profile data for the plurality of subscribers. The network provides signaling over the second link, to indicate an attempt to complete the communication service to the second link. A portion of the retrieved profile data is used to provide an identification of the one subscriber, as the calling party, over the second communication link. For example, the network may provide a ringing signal and a caller ID message naming the particular caller. Alternatively, if the link to the called party is busy, the network may provide a call waiting alert signal together with the caller ID message. The use of the virtual office identifier to locate the calling subscriber profile and identification data obviates the need to associate each such subscriber with a separate, unique telephone number or station identifier.

Other caller ID related aspects of the invention specifically involve providing the caller identification information with a call waiting type alert signal. The preferred embodiments of this feature utilize speech authentication, to identify the calling subscriber. Also, an office equipment number, assigned to the identified subscriber, is used to retrieve the subscriber's profile. The retrieved profile provides information used for further processing of the call from the subscriber, including data necessary to enable identification of the caller to the called party with the call waiting alert signal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

BEST MODE FOR CARRYING OUT THE INVENTION

In response to each of several types of service requests, the personal dial tone service of the present invention initially identifies the individual subscriber. Preferably the processing of calls from the subscriber utilizes a speaker identification/verification procedure. Processing of calls to the subscriber provides a voice prompt and relies on dialed inputs or analysis of speech inputs, to identify the particular subscriber called. The system then retrieves profile information corresponding to the identified subscriber. The communication network processes one or more calls to or from an identified communication link using the individual subscriber's profile data.

On an outgoing telephone call from the subscriber, for example, the service request may be an off-hook signal, and the network may provide 'dial-tone' type telephone services based on the retrieved profile information. In this example, the network may provide a dial tone signal or a customized prompt and then permit the caller to out-dial a call. Caller identification, calling features and/or billing functions apply based on the profile information, e.g. to provide the name of the actual calling party and to bill the call to this one subscriber's personal account.

On incoming calls to the identified subscriber, the network utilizes the subscriber's personal profile to provide one or more distinctive alerting services. If the link to the subscriber's location is available at the time of an incoming call, the service provides a distinctive ringing. If the link to the subscriber's location is busy at the time of an incoming call, the service provides a distinctive call waiting signal.

The personal dial tone service may utilize a variety of different networks. For example, the service may be adaptable to Internet based voice communications. The preferred embodiments utilize various implementations of modern telephone networks. To understand the invention, it may be helpful first to consider the architecture and operation of an advanced intelligent network (AIN) type implementation of a public switched telephone network, providing the personalized dial tone and alerting services of the present invention.

Figure 1:
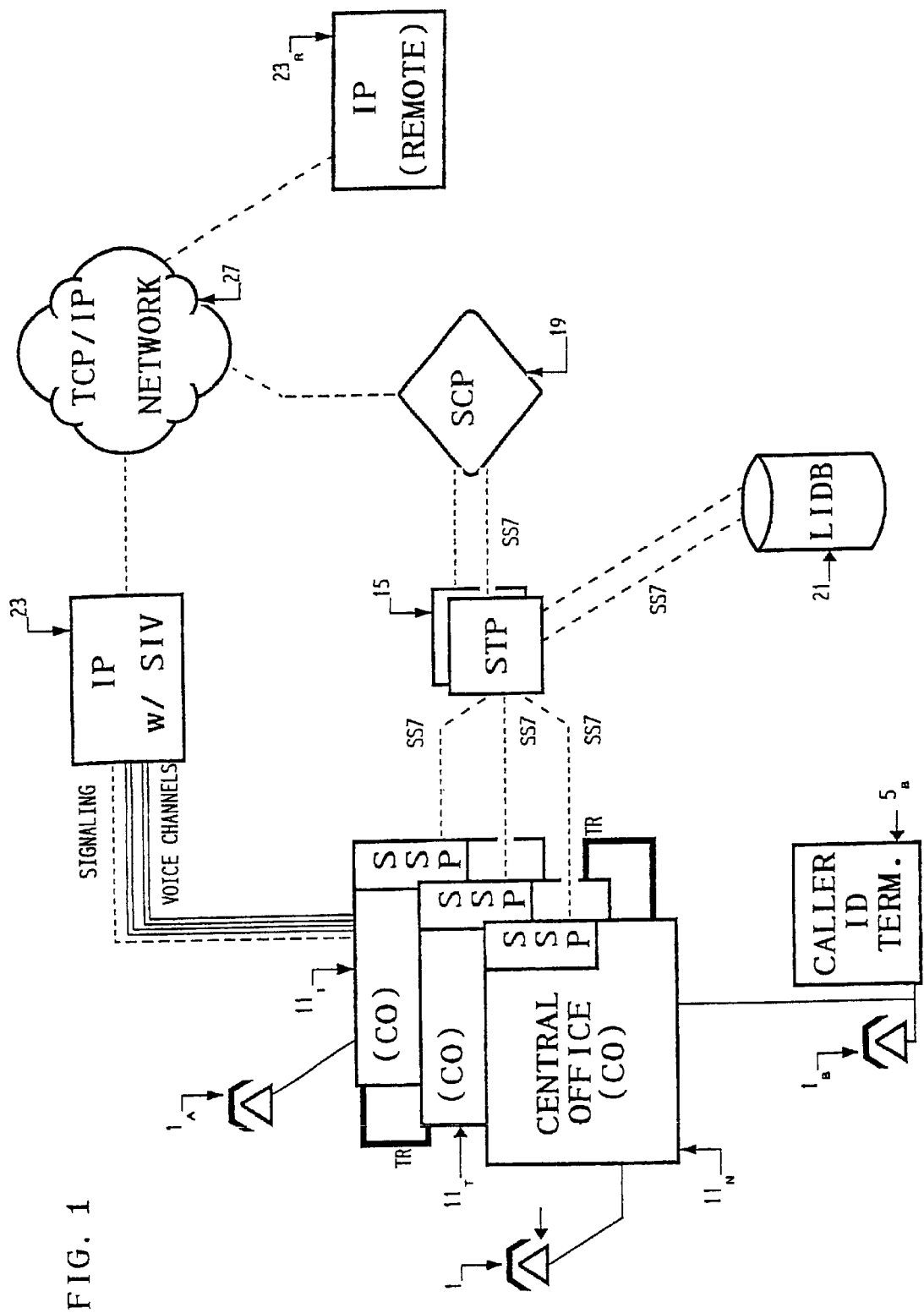
FIG. 1 is a simplified block diagram of an intelligent telephone network that may be used to offer the personal dial tone and related services of the present invention.

FIG. 1 provides a simplified illustration of the preferred intelligent telephone network for implementing the personal dial tone service in accord with the present invention. As shown, the telephone network includes a switched traffic network and a common channel signaling network carrying the control signaling messages for the switched telephone traffic network. In this implementation, the system further includes a secondary signaling network.

The telephone or traffic network (operated by a combination of local carriers and interexchange carriers) includes a number of end office and tandem office type central office (CO) switching systems 11. FIG. 1 shows a number of subscriber stations, depicted as telephones 1, connected to a series of central office switches $11_1$ to $11_N$. In the preferred implementation, the connections to the central office switches 11 utilize telephone lines, and the switches are telephone type switches for providing landline communication. However, it should be recognized that other communication links and other types of switches could be used. Trunk circuits TR carry communication traffic between the CO switches 11.

Each end office type central office switch, such as $11_I$ or $11_N$, provides switched telephone connections to and from local communication lines or other subscriber links coupled to end users stations or telephone sets 1. For example, the central office $11_I$ serves as an end office to provide switched telephone connections to and from local communication lines coupled to end users telephone station sets, such as telephone $1_A$, whereas the central office $11_N$ serves as an end office to provide switched telephone connections to and from local communication lines coupled to end users telephone station sets, such as telephone $1_B$.

The typical telephone network also includes one or more tandem switching offices such as office $11_T$, providing trunk-to-trunk connections between end offices. As such, the traffic network consists of local communication links and a series of switching offices interconnected by voice grade trunks, only two examples of which are shown at TR in FIG. 1. One set of trunks TR might interconnect the first end office $11_I$ to the tandem office $11_T$, whereas another set of trunks TR might interconnect the tandem office $11_T$ to another end office $11_N$. Other trunks (not shown) typically connect the end offices directly to each other. Although not shown, many offices serve as both end offices and tandem offices for providing different call connections.

One key feature of the present invention is that the program controlled switch accepts instructions to load profiles and/or receives profiles over a signaling link. In most cases, these profiles are identified by virtual office equipment (OE) numbers. The profiles include a range of information relating to subscriber services, such as service features, classes of service and individual billing options.

In accord with the invention, the profiles for subscribers to the personalized dial tone service also include at least some data relating to the identity of the individual subscriber, to facilitate caller ID service which will provide the identity of the actual caller to a called party on a ringing call or with a call waiting signal. The profiles for subscribers to the personalized dial tone service also include information to facilitate distinctive alerting services, both on ringing calls and for call waiting.

FIG. 1 shows connections to the stations 1 via lines, and typically these links are telephone lines (e.g. POTS or ISDN). It will be apparent to those skilled in the art, however, that these links may comprise other types of communication links, such as wireless links. At least some of the stations have caller ID capability. If the line is an ISDN line, the station may incorporate a display (not shown) for visually presenting the caller ID information and other signaling related messages.

If the link is a typical analog telephone line, the station equipment includes a caller ID terminal, one example of which is shown at $5_B$. The caller ID terminal $5_B$ may be incorporated in the associated telephone $1_B$, or the terminal may be a separate device connected to the line in parallel to the telephone. The terminal $5_B$ preferably displays at least telephone numbers and preferably displays alphanumeric information to enable displays of callers names in response to caller ID signals transmitted over the line between ringing signals. The preferred caller ID devices present the received data in the form of a digital data display; however, other forms of presentation, such as synthesized speech output, are contemplated. The caller ID terminal $5_B$ at least provides caller ID information in response to data received with the ringing signals, for incoming calls. If the customer subscribes to a deluxe call waiting service, with associated caller ID, the terminal will also display name and number information upon detection of data included with the call waiting alert signal.

Several CPE vendors have recently begun sales of smart display telephones, complying with the Analog Display Services Interface (ADSI) protocol. These telephones offer telephone number and associated data (e.g. name) displays for caller ID, for both incoming ringing calls and incoming waiting calls. These smart telephones have enhanced keyboard and display capabilities. The smart telephones have elements for dual tone multifrequency (DTMF) dialing and data transmission. In accord with the ADSI protocol, a smart telephone receives all downstream data transmissions as frequency shift key or 'FSK' type modulated data, in a manner similar to that used for simple caller ID. Telephones of this type provide caller ID displays on ringing incoming calls as well as for waiting calls, if the subscriber has the appropriate services. The programmable control features of this type of telephone provide easy access to further enhanced features to control customers' telephone services, for example, to use enhanced waiting call disposition options.

Although shown as telephones in FIG. 1, the terminal devices or stations 1 can comprise any communication device compatible with the local communication link. Where the link is a standard voice grade telephone line, for example, the terminals could include facsimile devices, modems etc. The processing in accord with the invention, however, relies on identification of the subscriber, preferably by voice based recognition or authentication. For this purpose, the terminals preferably include two-way voice communication elements.

The lines and trunks through the central offices 11 carry the communication traffic of the telephone network. The preferred telephone network, however, also includes an interoffice signaling network carrying a variety of signaling messages, principally relating to control of processing of calls through the traffic portion of the network. A variety of data networks may serve as this signaling network. The interoffice signaling network may be a common channel signaling (CCS) network, but for purposes of discussion we will describe the preferred signaling network as a common channel interoffice signaling (CCIS) network. The CCIS network includes packet data links (shown as dotted lines) connected to appropriately equipped central office switching systems such as offices 11 and a plurality of packet switches, termed Signaling Transfer Points (STPs) 15. To provide redundancy and thus a high degree of reliability, the STPs 15 typically are implemented as mated pairs of STPs. The CCIS network of the telephone system operates in accord with an accepted signaling protocol standard, preferably Signaling System 7 (SS7).

In the preferred embodiment shown in FIG. 1, each central office 11 has at least minimal SS7 signaling capability, which is conventionally referred to as a signaling point (SP) in reference to the SS7 network. As such, the offices can exchange messages relating to call set-up and tear-down, typically in ISDN User Part (ISDN-UP) format from the SS7 protocol. At least some, and preferably all, of the central office switches 11 are programmed to recognize identified events or points in call (PICs) as advanced intelligent network (AIN) type service triggers. In response to a PIC or trigger, a central office 11 initiates a query through the CCIS signaling network to a control node, such as a Service Control Point (SCP) 19, or to a database system, such as a Line Identification Database (LIDB) 21. The SCP 19 provides instructions relating to AIN type services. The LIDB 21 provides subscriber account related information, for calling card billing services or for subscriber name display purposes in an enhanced caller ID application. Those central office switching systems having full AIN trigger, query and responsive call processing capabilities for communication with the SCP and/or the LIDB are referred to as Service Switching Points (SSPs).

The central office switches 11 typically consist of programmable digital switches with CCIS communications capabilities. One example of such a switch is a 5 ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers, launch appropriate queries and control subsequent call processing based on information or instructions from the database. A specific example of an SSP capable switch, with enhancements for use of virtual office equipment (OE) numbers to retrieve individual subscriber's profiles, is discussed in detail later, with regard to FIG. 2.

The above described data signaling network between the SSP type central offices 11, the LIDB 21 and the SCP 19 is preferred, but other signaling networks could be used. For example, instead of the packet switched type links through one or more STP's, a number of central office switches, a LIDB, an SCP and any other signaling nodes could be linked for data communication by a token ring network. Also, the SSP capability may not always be available at the local office level, and several other implementations might be used to provide the requisite SSP capability. For example, none of the end office switches $11_I$ or $11_N$ may have SSP functionality. Instead, each end office would connect through a trunk to a tandem office $11_T$ which has the SSP capability. The SSP tandem $11_T$ then communicates with the SCP via an SS7 type CCIS link, as in the implementation described above. The SSP capable tandem switches are digital switches, such as the 5ESS switch from AT&T; and the non-SSP type end offices might be 1A analog type switches.

The SCP 19 may be a general purpose computer storing a database of call processing information. In the preferred implementation, the SCP 19 actually is an Integrated Service Control Point (ISCP) developed by Bell Atlantic and Bell Communications Research. The ISCP is an integrated system. Among other system components, the ISCP includes a Service Management System (SMS), a Data and Reporting System (DRS) and the actual database also referred to as the Service Control Point (SCP). In this implementation, the SCP maintains a Multi-Services Application Platform (MSAP) database which contains call processing records (CPRs) for processing of calls to and from various subscribers. The ISCP also typically includes a terminal subsystem referred to as a Service Creation Environment or SCE, for programming the MSAP database in the SCP for the services subscribed to by each individual customer. The SMS enables provisioning and updating of the subscriber files in the SCP.

The components of the ISCP are connected by an internal, high-speed data network, such as a token ring network. The internal data network also typically connects to a number of interfaces for communication with external data systems, e.g. for provisioning and maintenance. In the preferred embodiment, one of these interfaces provides communications to and from the SCP 19 via a packet switched data network, such as the TCP/IP network 27.

The SCP 19 may be implemented in a variety of other ways. The SCP may be a general purpose computer running a database application and may be associated with one of the switches. Another alternative is to implement a database of CPRs or the like within an STP (see e.g. Farris et al. U.S. Pat. No. 5,586,177).

The LIDB database 21 is a general purpose computer system having a signaling link interface or connection to a pair of STPs 15. The computer runs a database program to maintain a database of information relating to customer accounts and identifications. For example, a subscriber's entry in the LIDB database might include the subscriber's telephone number, a personal identification number for credit card billing purposes, and the subscriber's name and address. In one embodiment discussed later, the LIDB entry for a subscriber to personal dial tone service includes a telephone number together with a code assigned to the subscriber. For example, where several subscribers share a line and a telephone number, the combination of telephone number and subscriber code uniquely identifies each individual subscriber's record. Alternatively, each record could include the NPA-NXX of the serving end office together with the subscriber's virtual OE number.

The preferred telephone network also includes one or more message and speech processing platforms, preferably implemented as intelligent peripherals (IPs) 23. The IPs 23 provide enhanced announcement and digit collection capabilities, speech recognition and voice verification. The IP 23 is essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point," and the disclosure of the network and operation of the IP from that Patent is incorporated herein in its entirety by reference.

The IP 23 may connect to one or more of the central offices 11. The connections transport both communication traffic and signaling. The connection between a central office 11 and the IP 23 may use a combination of a Ti and a Simplified Message Desk Interface (SMDI) link, but preferably this connection utilizes a primary rate interface (PRI) type ISDN link. Each such connection provides digital transport for a number of two-way voice grade type telephone communications and a channel transporting signaling data messages in both directions between the switch and the IP.

As discussed more later, there are certain circumstances in which the SCP 19 communicates with the IP 23. These communications could utilize an 1129 protocol and go through an SSP type central office 11 and the SS7 network. However, in the preferred embodiment of FIG. 1, the IP 23 and the SCP 19 communicate with each other via a separate second signaling network 27. These communications through network 27 between the IP and the SCP may utilize an 1129+ protocol or a generic data interface (GDI) protocol as discussed in the above incorporated Patent to Wheeler, Jr. et al. Although not shown, the LIDB database 21 may also connect to and communicate via the signaling network 27.

The IP 23 can provide a wide range of call processing functions, such as message playback and digit collection. The IP 23 may play announcements or messages from storage, and the IP may perform a text-to-speech conversion to provide synthesized speech enunciation of text messages.

The IP 23 receives user inputs via the voice traffic network, at least in the form of dialed DTMF digits.

Preferably, the IP 23 also includes a speech recognition module for recognizing spoken selections and commands, as user inputs. As discussed in more detail later, the announcement and input collection functions of the IP 23 enable the IP to identify an individual subscriber that a caller is trying to reach. The IP may play a verbal menu of subscribers associated with an intended destination, and then detect a dialed or spoken user input signifying a selection of a subscriber from the menu. Alternatively, the IP 23 may prompt the caller to speak the name of the desired called party, and the speech recognition module in the IP will identify the subscriber from the caller's speech input.

In the preferred system, the IP 23 also performs speaker identification/verification (SIV) on audio signals received from subscribers. Specifically, the IP 23 used for the personal dial tone service includes a voice authentication module to perform the necessary speaker identification/ verification function. The IP 23 also includes storage for subscriber specific templates or voice feature information, for use in identifying and authenticating subscribers based on speech.

In the simplest form, the IP 23 serving a subscriber's local area stores the templates and performs the speaker identification/verification. However, in a system serving a large geographic area and providing personal dial tone to a large, roaming subscriber base, the templates may be transferred between SCP/IP pairs, to allow an IP near a subscriber's current location to perform the speaker identification/ verification on a particular call. For example, if a remote IP $23_R$ required a template for a subscriber from the region served by the IP 23, the remote IP $23_R$ would transmit a template request message through the network 27 to the IP 23. The IP 23 would transmit the requested template back through the network 27 to the remote IP $23_R$.

In a network such as shown in FIG. 1, routing typically is based on dialed digit information, profile information regarding the link or station used by the calling party and profile information regarding a line or station in some way associated with the dialed digits. Each exchange is identified by one or more three digit codes. Each such code corresponds to the NXX digits of an NXX-XXXX (seven digit) telephone number or the three NXX digits following the area code digits (NPA) in a ten-digit telephone number. The telephone company also assigns a telephone number to each subscriber line connected to each switch. The assigned telephone number includes the area code and exchange code for the serving central office and four unique digits.

Central office switches utilize office equipment (OE) numbers to identify specific equipment such as physical links or circuit connections. For example, a subscriber's line might terminate on a pair of terminals on the main distribution frame of a switch 11. The switch identifies the terminals, and therefore the particular line, by an OE number assigned to that terminal pair. For a variety of reasons, the operating company may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, an end office type switch will detect an off-hook condition on the line and provide dial tone. The switch identifies the line by its OE number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, call waiting, etc.

AIN call processing involves a query and response procedure between an SSP capable switching office 11 and a database system, such as the SCP 19 or the LIDB 21. The SSP capable switching offices initiate such processing upon detection of triggering events. At some point during processing of a telephone call, a central office switching system 11 will recognize an event in call processing as a 'Point in Call' (PIC) which triggers a query, for example to the SCP 19. Ultimately, the SCP 19 will return an instruction to the switching system 11 to continue call processing. This type of AIN call processing can utilize a variety of different types of triggers to cause the SSPs 11 to initiate the query and response signaling procedures with the SCP 19. In the presently preferred embodiments discussed below, the personal dial tone service utilizes an off-hook immediate trigger, a dialed number trigger such as a 3/6/10 trigger and a terminating attempt trigger (TAT), to facilitate different aspects of the service. Some enhanced caller ID services utilize a TAT to initiate queries to the LIDB database to obtain calling party name information for delivery to a called party who subscribes to the enhanced service. For incoming calls directed to numbers associated with the personal dial tone service, the serving end office switch will have a TAT set against the telephone number for links associated with that service, which will cause the switch to query the SCP 19.

In accord with one aspect of the present invention, before providing dial-tone service, the SSP central office 11 that is serving an outgoing call extends the call to the IP 23 providing the speaker identification/verification (SIV) functionality. In the preferred embodiments, this operation involves AIN type call routing to the IP. The IP 23 prompts the caller and collects identifying information, preferably in the form of speech. The IP analyzes the caller's input to identify the caller as a particular subscriber. If successful, the IP signals the SSP to load profile data for that subscriber into the register assigned to the call in the call store. In most of the preferred service applications, the IP disconnects, and the SSP central office 11 processes the call in accord with the loaded profile information. For example, the central office 11 may now provide actual dial tone or provide a message prompting the caller to dial a destination number. The caller dials digits, and the central office processes the digits to provide the desired outgoing call service, in the normal manner. The IP may stay on the line, to monitor speech and thus caller identity, for some service applications.

The call processing by the central office switch 11 utilizes the loaded subscriber profile information. For example, the profile data may indicate specific procedures for billing the call to this subscriber on some account not specifically linked to the originating telephone station or line. For example, in a college dormitory, the billing information might specify billing of a student's calls to the account of the student's parent(s). Any call restrictions, imposed at the wish of the parents, would be reflected in the profile. The switch would restrict the calling services accordingly, e.g. to limit distance, cumulative cost and/or duration of calls. The loaded profile also provides data facilitating delivery of subscriber specific caller ID.

The inventors also envision use of selected subscriber profile information on incoming calls. When a serving central office SSP 11 detects a call to a line having the personal dial tone service, processing hits a terminating attempt trigger (TAT). The SSP interacts with the SCP 19 and routes the call to the IP 23. The IP 23 prompts the caller to identify a desired called party, e.g. one of the students sharing the dormitory line. A prompt combined with speech recognition of an answering input or a menu announcement together with digit collection by the IP 23 facilitates identification of the desired called party from those associated with the line. Based on identification of the called subscriber, the IP 23 signals the SSP switch 11 to load profile data for that subscriber into the register assigned to the call in the call store. In this case, however, the switch 11 uses selectively loaded profile information for terminating the call. The IP disconnects, and the SSP central office 11 processes the call in accord with the loaded profile information.

For example, the central office 11 may provide a distinctive ringing signal corresponding to the identified subscriber. This service enables distinctive ringing for multiple subscribers on one line without assigning each subscriber a separate telephone number. If the line to the subscriber's station is in use on an existing or 'stable' call, the profile information might indicate that the called subscriber has call waiting. The end office switch therefore applies a call waiting alerting signal to the line, for audibly notifying the current user of the waiting call. In accord with one aspect of the invention, the switch applies a distinctive call waiting signal corresponding to the identified subscriber. This distinctive, personalized call waiting service provides a unique indication of which of the multiple subscribers who may use one line is being called on each call, again, without assigning each such subscriber a separate telephone number.

To provide the distinctive call waiting alert signal, the switch may modify the normal call waiting signal of 440 Hz applied in the communication channel on the line for 300±50 ms by imposing one of several off-on cadences. Alternatively, the switch may supply a selected one of several different frequency tones assigned for this call waiting service. Alternatively, the distinctive alerting tones for different subscribers may vary in amplitude and/or frequency over the period of signal transmission, where the variations differ to indicate the different subscribers. The profile information for the actual called subscriber would indicate to the switch which available notice signal to apply as the call waiting alert signal.

For incoming calls, the loaded profile information also may specify call forwarding in event of a busy or no-answer condition. This enables routing of the call to the identified subscriber's mailbox, or another alternate destination selected by the subscriber, even though the call did not utilize a unique telephone number uniquely assigned to the called subscriber.

The present invention also encompasses a procedure in which a subscriber calls in from a line not specifically designated for personal dial tone service. The network routes the call to the IP 23, and the IP identifies the subscriber and the line from which the subscriber called-in. The subscriber can interact with the IP 23 to have her personal dial tone service associated with that line, either for one call or for some selected period of time. The IP 23 instructs the appropriate central office switch(es) 11 to load and utilize profile data associated with the subscriber.

The IP 23 might instruct the end office switch to load the profile data only in the assigned call store register. The switch would use the profile data only for a single call, for example to bill a call from a pay-phone or a hotel room telephone to the subscriber's home account. Alternatively, the IP 23 might instruct the central office 11 serving the line to the calling station 1 to utilize a virtual office equipment number (OE) and associated profile data, for calls to and from that line for some period of time. In this later example, the IP 23 would also instruct the central office 11 serving the line to the subscriber's home station 1 to modify the subscriber's profile to forward calls for the subscriber's telephone number. The modified profile data in the home office 11 would result in forwarding of the subscriber's incoming calls to the selected station 1, for the set period of time. In such a case, the end office 11 serving that line or station could also provide distinctive ringing and/or distinctive call waiting alert signals on incoming calls specifically intended for the subscriber. On outgoing calls for the subscriber, the network provides caller ID information corresponding to the one subscriber.

The present invention relies on the programmable functionality of the central office switches and the enhanced call processing functionalities offered by the IPs. To understand these various functionalities, it may be helpful to review the structure and operation of a program controlled central office switch and one implementation of an IP. Subsequent description will explain several of the above outlined call processing examples in greater detail.

Figure 2:
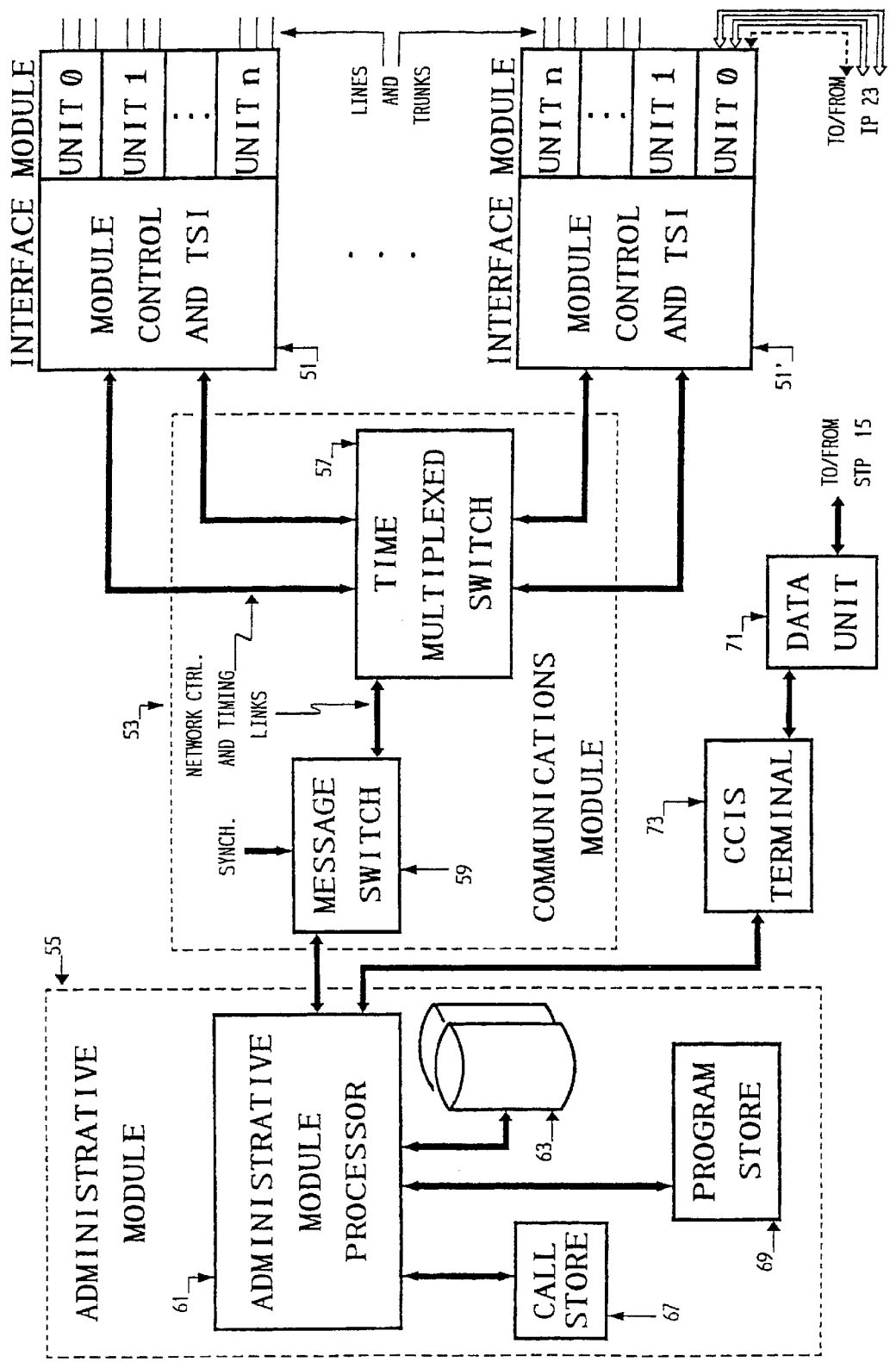
FIG. 2 is a simplified block diagram illustrating the significant functional components of a central office switching system used in the network of FIG. 1.

FIG. 2 is a simplified block diagram of an electronic program controlled switch which may be used as any one of the SSP type central offices 11 in the system of FIG. 1. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a POTS subscriber loop, the interface unit will provide analog to digital conversion and digital to analog conversion. Alternatively, the lines or trunks may use digital protocols such as ISDN, fractional T1, full T1 or higher rate digital protocols. Each interface module 51 also includes a digital service unit (not shown) which is used to generate call progress tones and receive and detect dialed digits in pulse code or dual-tone multifrequency form and generate a variety of other tones for transmission over links to customers' premises. For example, the digital service units generate the distinctive call waiting alert signals, utilized in the personalized call waiting service of the present invention.

In the illustrated embodiment, the unit 0 of the interface module 51' provides an interface for the signaling and communication links to the IP 23. In this implementation, the links preferably consist of one or more ISDN PRI circuits each of which carries 23 bearer (B) channels for communication traffic and one data (D) channel for signaling data.

Each interface module 51 includes, in addition to the noted interface units, a duplex microprocessor based module controller and a duplex time slot interchange, referred to as a TSI in the drawing. Digital words representative of voice information or other traffic are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers signaling data messages between the interface modules. In an embodiment of a telephone switch of the type shown, the switch 57 together with the TSIs of the interface modules form the overall switch fabric for selectively connecting the interface units in call connections. Those skilled in the art will recognize that a variety of other switch fabrics may be used.

The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 provides high level control of all call processing operations of the switch 11. The administrative module 55 includes an administrative module processor 61, which is a computer equipped with disc storage 63, for overall control of CO operations. The administrative module processor 61 communicates with the interface modules 51 through the communication module 53. The administrative module 55 may include one or more input/output processors (not shown) providing interfaces to terminal devices for technicians and data links to operations systems for traffic, billing, maintenance data, etc.

A CCIS terminal 73 and an associated data unit 71 provide an SS7 signaling link between the administrative module processor 61 and one of the STPs 15 (see FIG. 1). Although only one such link is shown, preferably there are a plurality of such links providing redundant connections to both STPs of a mated pair and providing sufficient capacity to carry all necessary signaling to and from the particular office 11. The SS7 signaling through the terminal 73, the data unit 71 and the STPs provides two-way signaling data transport for call set-up related messages to and from other offices. These call set-up related messages typically utilize the ISDN-UP (ISDN-users part) protocol portion of SS7. The SS7 signaling through the terminal 73, the data unit 71 and the STPs also provides two-way signaling data transport for communications between the office 11 and database systems or the like, such as the SCP 19 and the LIDB 21. The communications between the office 11 and the database systems or the like utilize the TCAP (transactions capabilities applications part) protocol portion of SS7.

As illustrated in FIG. 2, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, a register assigned within the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. For the personal dial-tone service, the assigned register in the call store 67 will receive and store different profile data depending on the particular subscriber associated with any given call. A register in the call store is assigned and receives call. profile data from the disc memory 63 both for originating subscribers on outgoing calls and for terminating subscribers on incoming calls.

Figure 3:
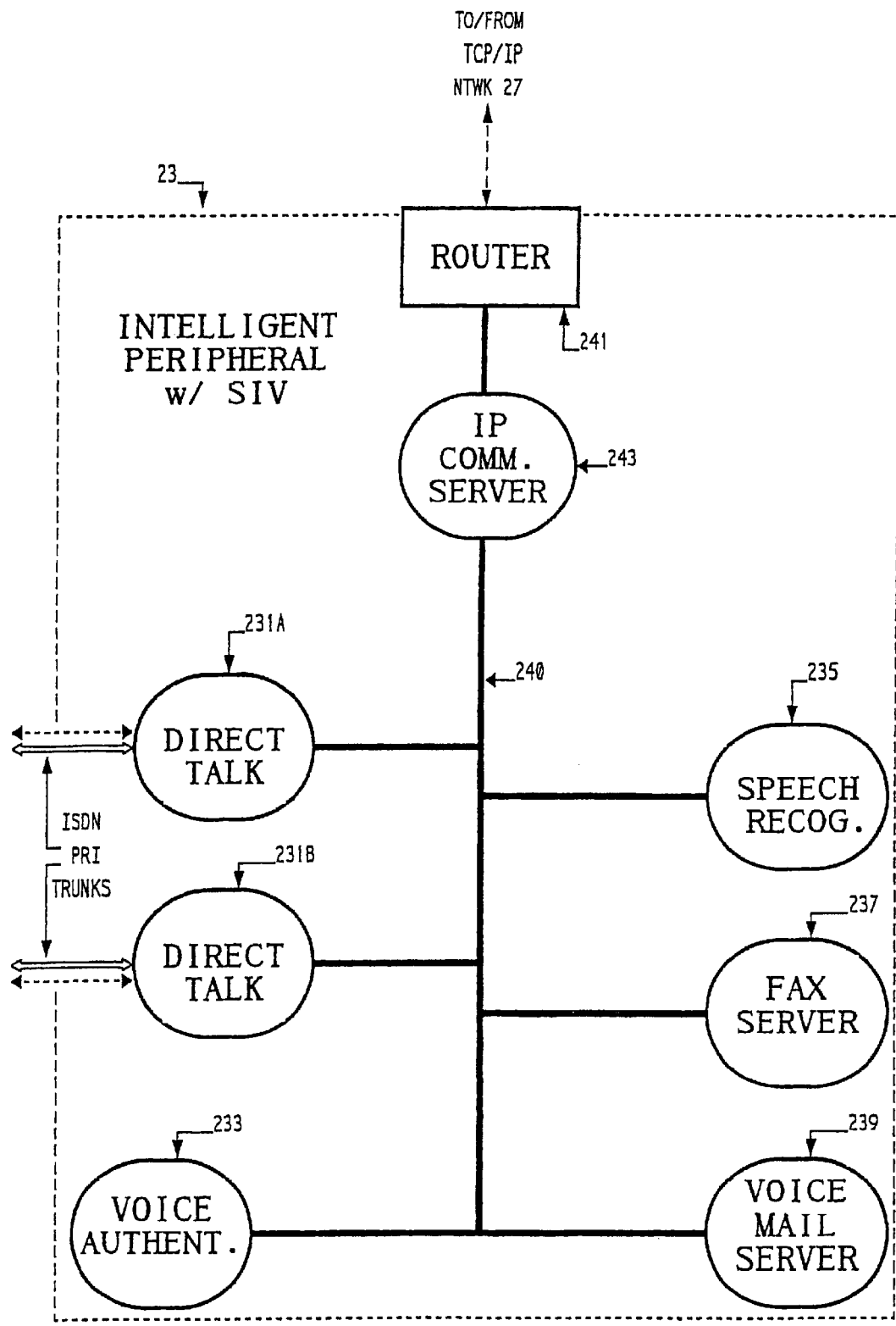
FIG. 3 is a simplified block diagram illustrating the significant functional components of an Intelligent Peripheral (IP) used in the network of FIG. 1.

A variety of adjunct processor systems known in the telephone industry can be used as the IP 23. The critical requirements are that the IP system process multiple calls and perform the subscriber identification functions, preferably by speaker identification and authentication and by audible announcements and speech recognition. FIG. 3 is a functional diagram illustrating of an IP 23 for performing the subscriber identification functions, possibly by dialed digit input and preferably by analysis and recognition of speech.

The preferred IP architecture utilizes separate modules for different types of services or functions, for example, one or two Direct Talk type voice server modules 231A, 231B for interfacing ISDN PRI trunks to the SSP central office(s) 11. Separate modules 233, 235 perform voice authentication and speech recognition. The IP 23 includes a variety of additional modules for specific types of services, such as a server module 237 for fax mail, and another server module 239 for voice mail services. The various modules communicate with one another via an internal data communication system or bus 240, which may be an Ethernet type local area network.

Each Direct Talk module 231A or 231B comprises a general purpose computer, such as an IBM RS-6000, having digital voice processing cards for sending and receiving speech and other audio frequency signals, such as IBM D-talk 600 cards. Each voice processing card connects to a voice server card which provides the actual interface to T1 or primary rate interface ISDN trunks to the switching office. In the PRI implementation, the Direct Talk computer also includes a signaling card, providing two-way signaling communication over the D-channel of the PRI link. Each Direct Talk computer also includes an interface card for providing two-way communications over the internal data communications system 240.

The voice processing cards in the Direct Talk modules 231A, 231B provide voice message transmission and reception as well as dialed digit collection capabilities. The modules 231A, 231B also perform the necessary line interface functions for communications to and from those servers which do not incorporate actual line interfaces. For example, for facsimile mail, a Direct Talk module 231 connected to a call would demodulate incoming data and convert the data to a digital format compatible with the internal data communication network 240. The data would then be transferred over network 240 to the fax server 237. For outgoing facsimile transmission, the server 237 would transfer the data to one of the Direct Talk modules over the network 240. The Direct Talk module 231 would reformat and/or modulate the data as appropriate for transmission over the ISDN link to the switch 11.

The Direct Talk modules provide a similar interface function for the other servers, such as the voice mail server 239, the speech recognition module 235 and the voice authentication module 233. For incoming speech signals, the Direct Talk module connected to a call receives digital speech signals in the standard pulse code modulation format carried on a B-channel of an ISDN link. The Direct Talk module reformats the speech data and transmits that data over the internal network 240 to the server or module performing the appropriate function, for example to the authentication module 233 for analysis and comparison of features to stored templates or feature data for known subscribers.

In the outgoing direction, the currently connected Direct Talk module 231 may play an announcement from memory (not separately shown), e.g. a prompt asking a caller to say their name or a prompt asking a caller to say the name of a called subscriber. Alternatively, the Direct Talk module may receive digitized speech over the network 240 from one of the other modules, such as a stored message retrieved from voice mail server 239. The Direct Talk module reformats the speech signal as needed for transmission over the ISDN B-channel to the caller. Preferably the Direct/Talk computer also runs software to convert text to speech signals.

The illustrated IP also includes a communication server 243. The communication server 243 connects between the data communication system 240 and a router 241, which provides communications access to the TCP/IP network 27 that serves as the second signaling communication system. The communication server 243 controls communications between the modules within the IP 23 and the second signaling communication system. The server 243 and the router 241 facilitate communication between the elements of the IP 23 and the SCP 19. The IP may also use this communication system to communicate with other IP's, for example to send subscriber voice template information to the remote IP 23$_R$ (FIG. 1) or to receive such information from that IP or some other network node. Although not shown, the LIDB 21 may connect to the network 27, in which case occasions may arise when the LIDB 21 and the elements of the IP 23 communicate via the router 24 and the network 27.

The personal dial tone service relies on the voice authentication module 233 to perform the necessary speaker identification/verification function. For the identification and authentication of subscribers, the voice authentication module 233 within the IP 23 stores a template or other feature or voice pattern information for each person who has the personal dial tone service in the area that the IP services. For example, if the subscriber utilizes the personal dial tone service from a particular line, such as a shared line in a dormitory or the like, the IP stores the subscriber's voice pattern information in a file associated with the office equipment (OE) number of the particular line. If the IP 23 serving a call does not store the template or feature data for a particular subscriber, the IP 23 may obtain subscriber identification by dialed digit input and then obtain a copy of the template or feature data from a remote IP 23$_R$ via communication through the TCP/IP network 27, in order to authenticate the subscriber's identity.

Using current technology, a new subscriber would get on line with the IP serving that subscriber and 'train' that IP by speaking certain phrases. From the received audio signals representing those phrases, the IP would create and store templates or other speech pattern information for use in identifying and/or verifying that a caller is the particular subscriber.

During actual call processing, the voice authentication module 233 receives speech information from the caller. The voice authentication module 233 compares the received information to its stored template or feature data to identify a calling party as a particular subscriber.

The present invention also relies on the speech recognition capability of the module 235, particularly in processing of incoming calls in certain situations. The speech recognition module 235 enables the IP 23 to analyze incoming audio information to recognize vocabulary words. The IP 23 interprets the spoken words and phrases to determine subsequent action. For example, the IP might recognize the caller speaking the name of a called subscriber and use the subscriber identification to instruct the terminating central office to control the call in accord with that subscriber's profile. Examples of such control include distinctive ringing if the called party's line is available, as well as distinctive alerting for call waiting in cases where the called party's line is engaged with a pre-existing call.

The preferred routing of the calls in accord with the invention utilizes AIN type call processing. To understand the call processing, it may be helpful to consider several specific examples in more detail.

Figure 4A:
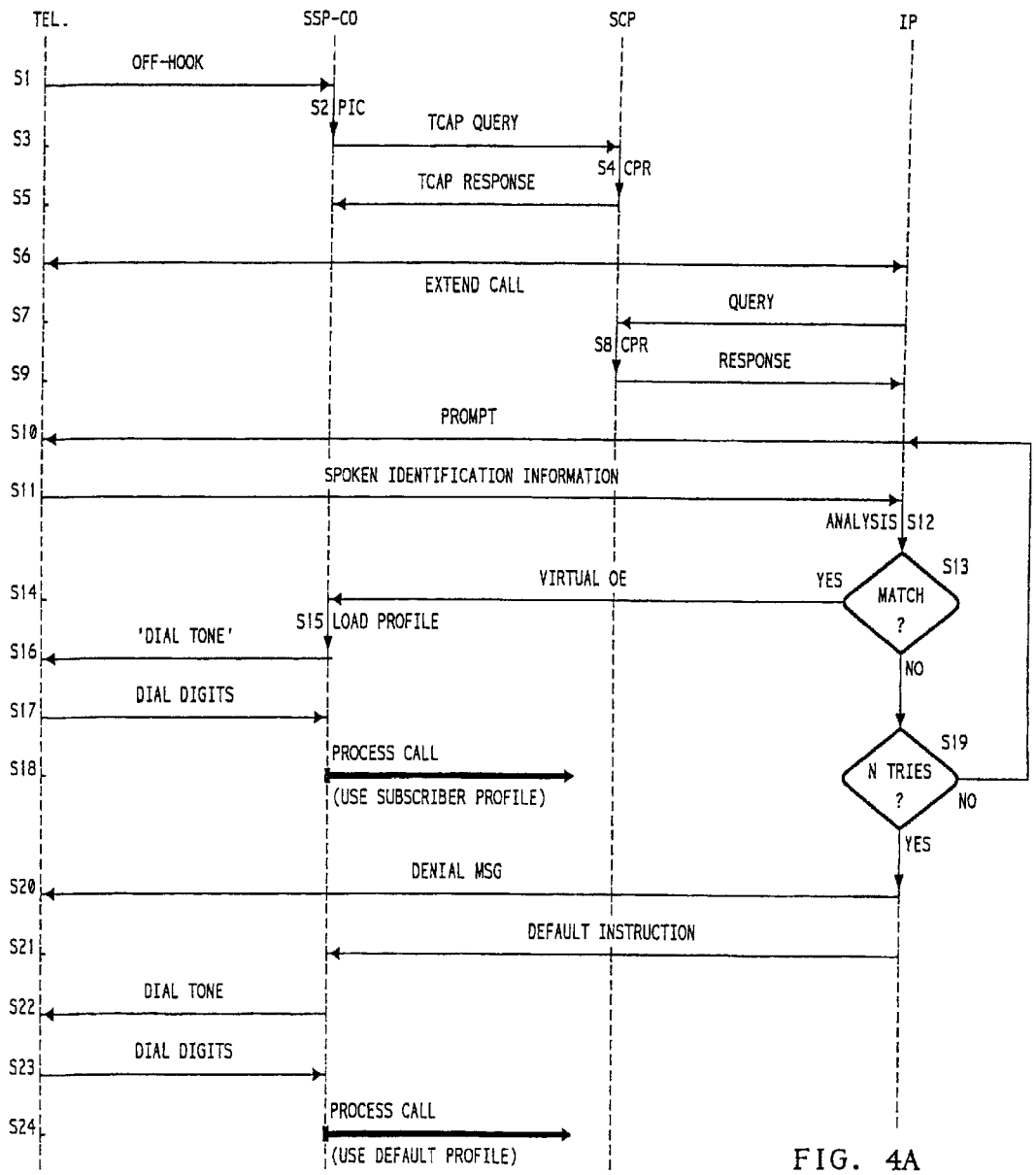
FIG. 4A is a combination signal flow and process flow diagram useful in understanding a specific example of call processing for providing the personal dial tone service over a shared use line.
Figure 4B:
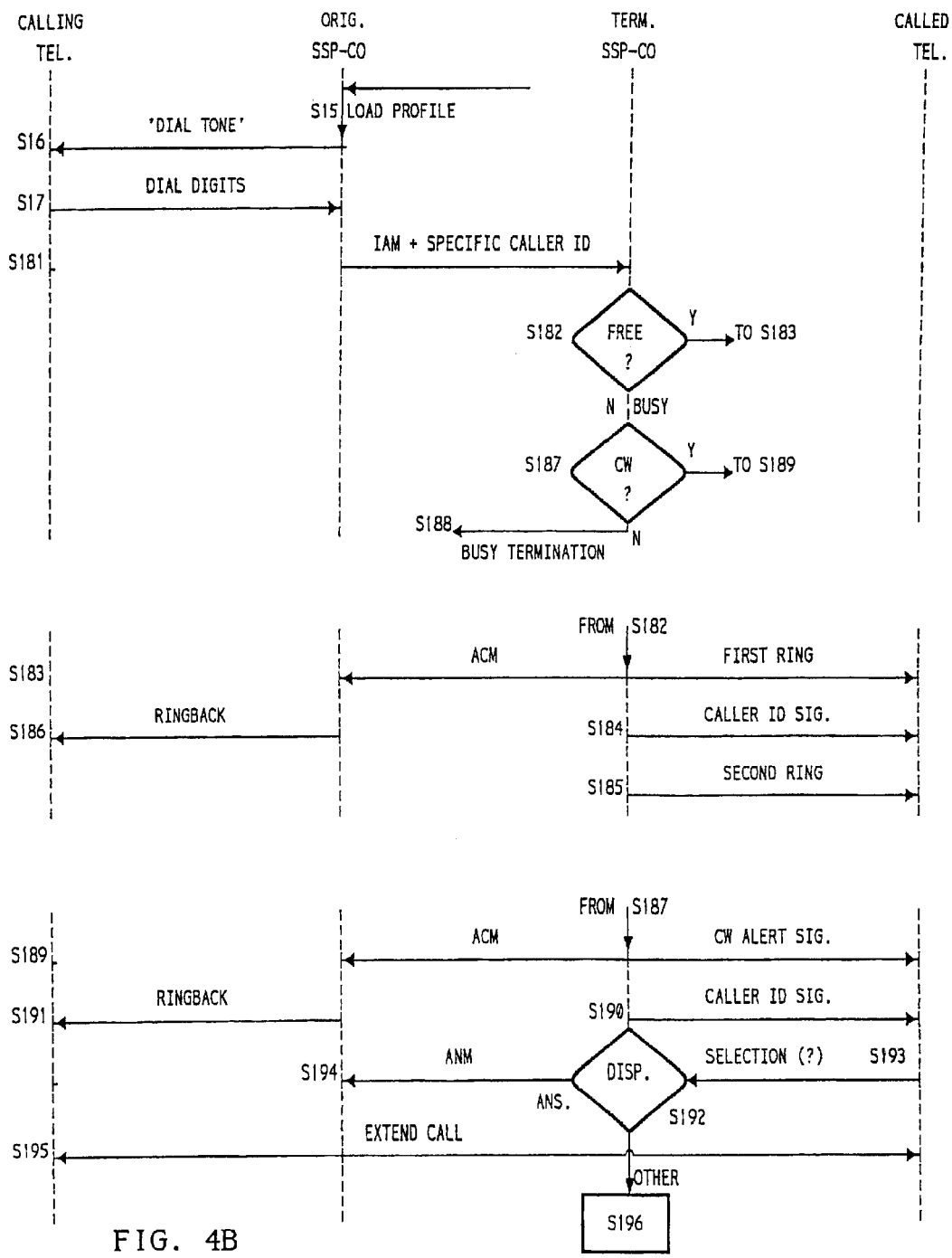
FIG. 4B is a combination signal flow and process flow diagram useful in understanding a first embodiment of the processing for providing the identity of the actual caller to the destination for display as caller ID information.
Figure 4C:
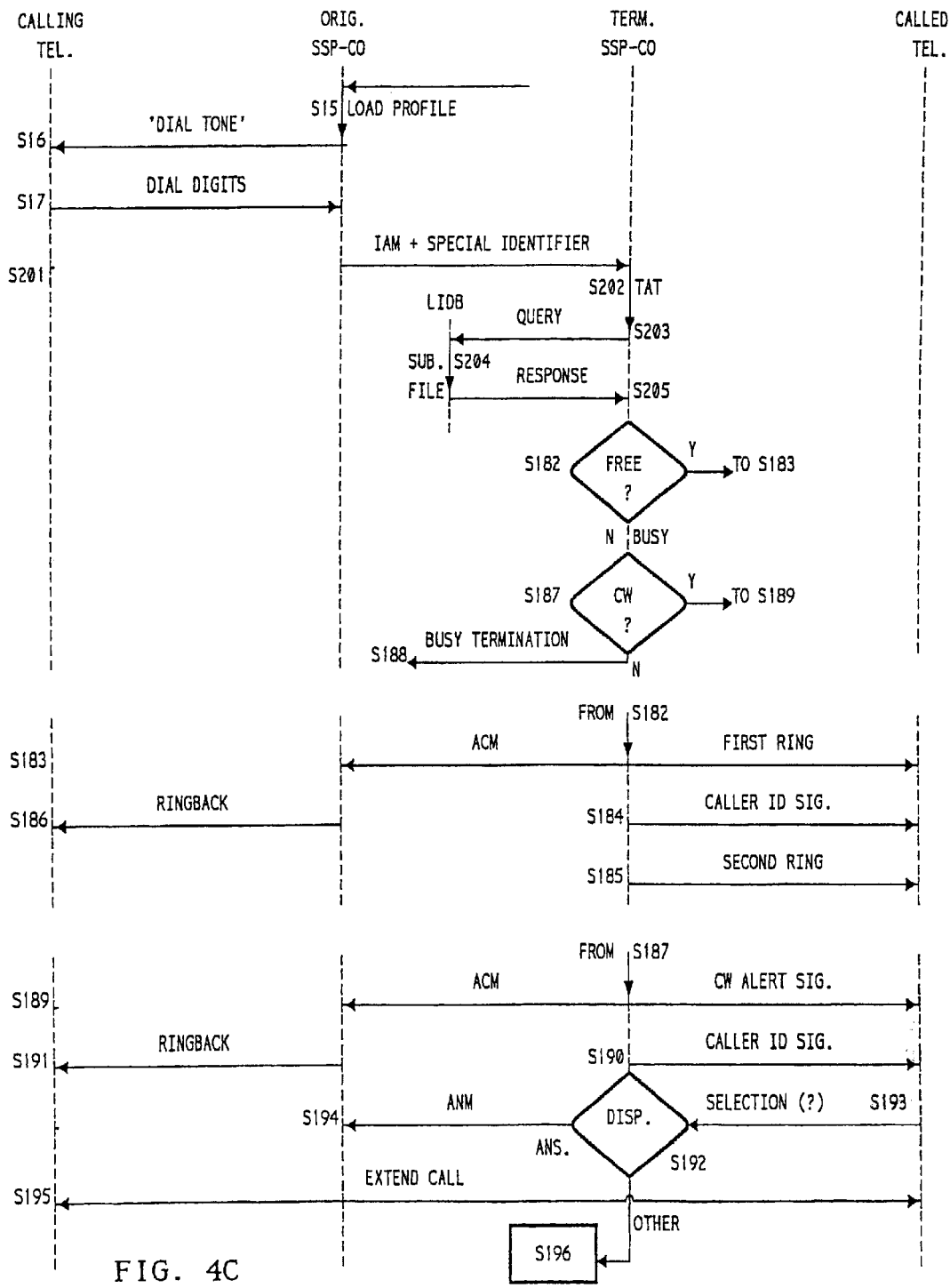
FIG. 4C is a combination signal flow and process flow diagram useful in understanding another embodiment of the processing for providing the identity of the actual caller to the destination for display as caller ID information.

In a first example, consider an outgoing call from the station $1_A$ to the station $1_B$. Assume per call assignment of profile data to the originating line, for personal dial tone service on each outgoing call. FIG. 4A provides a simplified flow diagram of the signal flow and processing for such an outgoing call. FIGS. 4B and 4C provide similar diagrams of two variations on the associated processing to complete the call of FIG. 4A.

Assume use of a standard telephone for purposes of this example and for purposes of discussion of FIG. 4A. The person lifts the handset creating an off-hook state in the telephone $1_A$ and a corresponding signal or change in state on the line to the central office 11 (step S1). In this call flow, the off-hook signal is a type of service request, i.e. a request to make an outgoing call. The serving central office 11$_I$ detects the off-hook and commences its call processing. Specifically, the central office assigns a register in the call store 67 to this call and loads profile information associated with the off-hook line from the disc storage 63 into the assigned register. In this case, the central office 11$_I$ is an SSP capable office, and the loaded profile data indicates an off-hook immediate trigger set against the particular line. The serving SSP type office 11$_I$ therefore detects this off-hook PIC as an AIN trigger (step S2).

In response to the off-hook and the off-hook trigger set in the subscriber's profile, the SSP type central office switch 11$_I$ launches a query to the SCP 19 (step S3). Specifically, the SSP 11$_I$ creates a TCAP query message containing relevant information, such as the office equipment (OE) number assigned to the off-hook line, and transmits that query over an SS7 link to one of the STPs 15. The query includes a destination point code and/or a global title translation addressing the message to the SCP 19, and the STP 15 relays the query message over the appropriate link to the SCP 19. The query from the SSP central office 11$_I$ identifies the caller's line by its associated office equipment (OE) number and possibly by a single telephone number associated with the off-hook line.

In response to a query, the SCP 19 accesses its internal database, typically, the MSAP database set up in the ISCP, to determine how to process the particular call. The SCP 19 identifies an access key in the query and uses the key to retrieve the appropriate record from the database. In this case, the query indicates an off-hook immediate trigger as the trigger event, therefore the SCP 19 uses the identifier of the office 11, in combination with the calling party office equipment (OE) number as the access key. The SCP 19 retrieves a call processing record (CPR) corresponding to the office equipment (OE) number associated with the off-hook line and proceeds in accord with that CPR (step S4).

For the present example of the personal dial tone service, the CPR will provide information necessary for routing the call to some node of the network that will perform speaker identification/verification (SIV). In the preferred embodiment, the SIV is a function performed by an Intelligent Peripheral (IP), therefore the CPR provides information for routing the call to the nearest available IP 23 having the SIV capability.

Based on the CPR, the SCP 19 formulates a response message instructing the SSP central office $11_I$ serving the customer to route the call. In this case, the message includes information, e.g. an office equipment (OE) number or telephone number, used for routing a call to the identified IP 23. The SCP 19 formulates a send-to-outside-resource type TCAP response message in SS7 format, with the destination point code identifying the SSP office $11_I$. The SCP 19 transmits the TCAP response message back over an SS7 link to the STP 15, and the STP 15 in turn routes the TCAP message to the SSP central office $11_I$ (see step S5).

The SSP type switch in the central office $11_I$ uses the routing information from the response message to connect the call to one of the lines or channels to the IP 23. A two-way voice grade call connection now extends between the calling station $1_A$ and the IP 23 (step S6) In the present example, the switch actually connects the off-hook line to the line to the IP before providing dial tone.

As noted above, the communication link to the IP 23 provides both line connections and signaling, preferably over a primary rate interface (PRI) type ISDN link. When the central office $11_I$ extends the call from the calling party's line to a line circuit (over a B channel) to the IP 23, the switch in that office also provides call related data over the signaling link (D channel for ISDN). The call related data, for example, includes the office equipment (OE) number normally associated with the off-hook line and possibly the telephone number for that line.

In response to the incoming call, the IP 23 will seize the line, and it will launch its own query to the SCP 19 (step S7). In the preferred network illustrated in FIG. 1, the IP 23 and the SCP 19 communicate with each other via a separate second signaling network 27, for example utilizing either an 1129+ protocol or a generic data interface (GDI) protocol as discussed in U.S. Pat. No. 5,572,583 to Wheeler, Jr. et al. The query from the IP 23 again identifies the caller's line by at least its associated office equipment (OE) number.

In response to the query from the IP 23, the SCP 19 again accesses the appropriate CPR (step S8) and provides a responsive instruction back through the network 27 to the IP 23 (step S9). Although the IP 23 could passively monitor any speech that the user might utter, the preferred implementation utilizes a 'Challenge Phase' to prompt the user to input specific identifying information. In this case, the instruction from the SCP 19 causes the IP 23 to provide a prompt message over the connection to the caller (step S10). Here, the signal to the caller may be a standard dial tone or any other appropriate audio signal. Preferably, the instruction from the SCP 19 causes the IP 23 to provide an audio announcement prompting the caller to speak personal information. In one preferred example, in step S10 the IP plays an audio prompt message asking the caller, 'Please say your full name'. The process may ask for any appropriate identifying information.

The signal generated by the IP 23 goes over the lines and through the central office switch(es) for presentation via the off-hook telephone $1_A$ to the calling party. In response, the caller will speak identifying information into their off-hook telephone, and the network will transport the audio signal to the IP 23 (step S11).

As noted above, an IP 23 can provide a wide range of call processing functions, such as message playback and digit collection. In the preferred system, the IP also performs speaker identification/verification (SIV) on the audio signal received from the off-hook telephone in step S11. When the IP 23 receives speech input information during actual call processing, for this service example, the IP analyzes the speech to extract certain characteristic information (step S12).

The IP 23 stores a template or other voice pattern information for each person who has the personal dial tone service in the area that the IP normally services. If the IP 23 does not store the particular template or feature information it needs to process a call, the IP 23 can communicate with a remote IP $23_R$ to obtain that information. In the present shared line example, the IP 23 will store template or feature data for each subscriber associated with the particular off-hook line.

When the IP 23 receives input speech and extracts the characteristic information during actual call processing, the IP compares the extracted speech information to stored pattern information, to identity and authenticate the particular caller. In the present example, the voice authentication module 233 in the IP 23 compares the extracted speech information to the stored template or feature data for each subscriber associated with the particular off-hook line.

In step S13, the IP 23 determines if the information extracted from the speech input matches any of the stored template data or feature data for an identifiable subscriber (within some threshold level of certainty) If there is a match, the IP now knows the identity of the calling subscriber. Based on the identification of the calling subscriber, the IP 23 selects a control code that corresponds to the subscriber. In the preferred embodiments, this control code is a virtual office equipment (OE) number assigned to the subscriber.

The IP 23 formulates a D-channel signaling message containing the virtual office equipment (OE) number together with an instruction to load that OE number into the register assigned to the call in place of the OE number of the off-hook line. The IP 23 supplies the message to the SSP central office switch $11_I$ over the D-channel of the ISDN PRI link (step S14). In response, the administrative module processor 61 rewrites the OE number in the register assigned to the call using the OE number received from the IP 23.

Upon rewriting the OE number in the register, the administrative module processor 61 of central office switch $11_I$ also reloads the profile information in the register (step S15). Specifically, the administrative module processor 61 retrieves profile information associated with the virtual office equipment (OE) number from the disc storage 63 into the register. As such, the profile information in the assigned register in the call store 67 now corresponds to the identified subscriber, rather than to the off-hook line.

The profile information provides a wide range of data relating to the subscriber's services. The profile data provides at least some identification information, typically for services such as subscriber specific caller ID. The profile data may provide billing information, enabling billing for the call to this particular subscriber. The profile also defines various service features available to this subscriber on outgoing calls, such as three-way calling and call waiting.

The profile may define a class of calling service available to the subscriber. In the dormitory example, the caller may be allowed a set dollar amount for long distance calls per month (e.g. $50.00). The profile data will indicate the remaining amount at the time of the call and will cause the switch to interrupt service when the available amount is exhausted. Other class of service restrictions might enable long distance calls only if collect and/or only if calling one or two specified numbers (e.g. only to the parents' house). The class of service might enable only long distance calls within a region or country but not international calls. In the case of a family, the parents might have unlimited services, whereas the children would be able to make only local calls. The feature restriction could also prevent the children from making 976, 900 or other special types of calls.

In the presently preferred implementation, when the central office switch $11_I$ reloads the profile, the central office disconnects the link to the IP 23 and connects tone receivers to the caller's line. Optionally, the central office $11_I$ may provide a 'dial tone' or other message over the line (step S16). The caller now dials digits in the normal manner (step S17), and the switch in the central office $11_I$ loads the dialed digits into the assigned register within the call store 67. The central office $11_I$ utilizes the dialed digits and the subscriber's profile data to process the call (S18). For example, if the dialed digits represent a call within the subscriber's permitted class of service, the switch completes the call to the destination station $1_B$ using the dialed digits in the normal manner. If the profile data requires a particular billing treatment, e.g. to bill a long distance call to the subscriber, the switch makes the appropriate record and forwards the record to the exchange carrier company's accounting office equipment. If the outgoing call activates another trigger, indicating application of another AIN type service, the switch communicates with the SCP again, and the network provides the further service on the outgoing call. In accord with another aspect of the invention, the network provides caller ID data naming the identified subscriber to the destination station, either with a ringing signal or with a call waiting alert signal.

The processing to complete the call, performed in step S18, actually involves a sequence of steps. Of particular note, some of these steps facilitate delivery of personalized caller ID information to the destination station. The present invention involves delivering caller ID information which corresponds to the specific identified subscriber, preferably the subscriber's name, rather than simply the number of the line or station from which the subscriber initiates the call. Two processing methodologies are envisioned for providing this subscriber-specific caller ID feature, one involving access to name information in a central database such as LIDB and the other relying on name data from the subscriber's profile.

FIG. 4B is a simplified process and signal flow diagram, illustrating the call completion operations, including caller ID display using data from the identified subscriber's profile. The network performs the steps depicted in FIG. 4B after identification of the subscriber, preferably based on speaker identification—verification (SIV).

To recap briefly, the IP 23 supplies the signaling message containing the virtual office equipment (OE) number and the instruction to load that OE number into the assigned register to the SSP central office switch $11_I$ over the D-channel of the ISDN PRI link. In response, the administrative module processor 61 rewrites the OE number in the register and reloads the profile information in the register (step S15). The central office $11_I$ provides dial tone or the like over the line (step S16), the caller dials digits corresponding to the desired destination (step S17), and the switch in the central office $11_I$ begins its processing to route the call through the network.

Initially, the central office $11_I$ uses the dialed number to initiate a CCIS communication with the exchange serving the intended destination, in the example, the terminating central office $11_N$. Specifically, the subscriber's serving central office $11_I$ generates an Initial Address Message (IAM) for transmission to the terminating central office $11_N$ (S181). The IAM message includes the SS7 destination point code (DPC) of the terminating central office $11_N$ and the SS7 origination point code (OPC) of the subscriber's serving-end (originating) central office $11_I$, for addressing purposes. The payload portion of the IAM message includes the called and calling telephone numbers. In accord with the invention, the originating end office $11_I$ reads name data from the identified subscriber's profile, currently loaded in the assigned register. The office $11_I$ places that subscriber specific caller ID data in an additional field of the IAM message or in an accompanying information message addressed in the same manner as the IAM message. The originating central office $11_I$ transmits the IAM message and possibly an accompanying information message through the CCIS network to the distant terminating office $11_N$ (step S181).

When the terminating office $11_N$ receives the IAM message, the administrative module processor for that office retrieves the customer profile for the called number identified in the destination number field of that message (e.g. the number for the telephone $1_B$) from its mass storage system and loads that profile into one of its call store registers. This terminating profile may be the profile associated with the telephone number, an associated telephone line and a single number, for a subscriber having normal dial tone service. As discussed more later, the terminating profile may relate to a called subscriber having the personal dial tone service.

If the loaded terminating profile indicates that the called party has an enhanced caller ID service, with name display, the terminating central office $11_N$ would normally recognize the attempt to complete to that party's number message as a terminating attempt trigger (TAT) type point in call (PIC) to trigger access to the LIDB database for name information. However, in this embodiment of the invention, the terminating end office detects the receipt of the subscriber's name data with the IAM message, therefore the administrative module processor in that office overrides the trigger.

The terminating central office switching system $11_N$ first determines if the called line is free (S182). If so, processing branches to step S183. The terminating central office switching system $11_N$ next transmits an Address Complete Message (ACM) back to the central office $11_I$ and applies ringing signal to the called party's line (S183).

As part of its operations to ring the called telephone station, the terminating central office $11_N$ transmits a caller ID signal over the line (S184). If the called party has ISDN service or the like, the switch sends a signaling message along with the ringing signal. If the called party has analog telephone service, the switch $11_N$ transmits a caller ID message (step S184) as frequency shift keyed (FSK) data inserted in the silent interval between the first ringing signal (step S183) and the second ringing signal (S185) applied to the called party's line.

In accord with the invention, the caller ID message applied to the called party's line includes the telephone number associated with the calling station $1_A$ and at least some additional data specific to the identified subscriber. If the called party has enhanced caller ID for displaying name data, the ISDN telephone or the caller ID terminal $5_B$ receives two messages, one containing the number and the other containing the name data received with the IAM message in step S181. The caller ID terminal $5_B$ or a display device in the ISDN telephone displays the received number and name information, identifying the actual calling party, for review before the called party chooses to answer the call.

If the called party subscribes only to normal caller ID, the end office switch $11_N$ can transmit only a limited amount of information. For this purpose, the switch will select and transmit one or two characters from the subscriber identification data along with the telephone number. For example, if four persons normally call from the particular originating telephone station or line, the data sent to the terminating central office $11_N$ might include a letter or number identifying each subscriber along with the name data. The switch $11_N$ would transmit that letter or number with the telephone number in the caller ID message for display.

As noted, in step S183, the terminating central office switching system $11_N$ formulates and sends an ACM message. The ACM includes a variety of information, including a calling party status indicator, e.g. line free or busy. In the case where the called line is not busy, the terminating end office $11_N$ rings the station $1_B$ corresponding to the dialed digits, and generates the appropriate indicator in the Address Complete Message (ACM) to indicate that it received the request for a call and that the number is not busy. The ACM message is sent back by simply reversing the point codes from the IAM message. Now the destination point code (DPC) is the point code of the central office $11_I$, and the origination point code (OPC) is the point code of the terminating central office $11_N$. In response to the ACM message, since the called line is available, the originating central office $11_I$ applies a ringback tone signal to the line to the calling station $1_A$ (S186). While the called party's station $1_B$ rings in response to the ringing signals and their associated caller ID display terminal $5_B$ shows the personalized caller ID, the calling party hears a ringing-like sound through their station $1_A$.

Although the steps are not shown, for convenience, if someone answers the telephone station $1_B$, the terminating central office switching system $11_N$ detects an off-hook condition and sends an Answer Message (ANM) back to the originating central office $11_I$ through one or more of the STPs 15. The ANM message indicates that the called telephone $1_B$ was picked up. Also, at that time the actual telephone traffic trunk circuit is connected together between the central offices $11_I$ and $11_N$. The central offices 11 connect the lines to the stations to the respective ends of the trunk circuit, to complete the voice path. At this point, actual voice communication is established between the calling station $1_A$ and the called station $1_B$. Communication continues until one or both parties hang up, at which time, all of the switched connections are torn down.

Returning to step S182, recall that the terminating central office switching system $11_N$ determined first if the line to the called station was free. Assume now that the called line is busy (not free). Processing in step S182 therefore branches to step S187. In that step, the administrative module processor in the terminating central office switching system $11_N$ checks the called party's profile to determine if the called party subscribes to a call waiting service. If not, then the terminating central office switching system $11_N$ sends an ACM message indicating busy condition, the originating central office switching system $11_I$ provides a busy tone over the caller's line, and the call terminates in the normal manner for a 'busy' line condition (S188).

However, if the called party subscribes to call waiting service, processing in step S187 branches to step S189, instead. Here the terminating central office switching system $11_N$ transmits an Address Complete Message (ACM) indicating an available line status back to the central office $11_I$, essentially in the same manner as in step S183. At the same time, the terminating central office switching system $11_N$ applies a call waiting (CW) alert tone to the existing call connection on the called party's line (S189). As discussed in more detail later with regard to FIGS. 5A–5C, if the called party is an identified subscriber to the personal dial tone service, the alerting signal is distinctive and provides a user conversing on telephone station $1_B$ an indication of the identity of the called subscriber.

With the transmission of the call waiting alert signal, the terminating central office switching system $11_N$ also sends a caller ID signal over the line (S190). If the called party has ISDN service or the like, the switch sends a signaling message along with the ringing signal. If the called party has analog telephone service, the switch $11_N$ transmits a caller ID message (step S190) as frequency shift keyed (FSK) data, in essentially the same manner as used for existing call waiting deluxe identification services.

As in the example of a ringing call to an available line, in accord with the invention, the caller ID message applied to the called party's line in step S190 includes the telephone number associated with the calling station $1_A$ and at least some additional data specific to the identified subscriber. If the called party has enhanced caller ID for displaying name data, the ISDN telephone or the caller ID terminal $5_B$ receives the two messages. The first message contains the caller's telephone number, and the other message contains the name data received with the IAM message in step S181. The caller ID terminal $5_B$ or a display device in the ISDN telephone displays the received number and name information, identifying the actual calling party. Alternatively, if the called party subscribes only to normal caller ID, the end office switch $11_N$ transmits the number and one or two characters from the subscriber identification data, as discussed above. The caller ID terminal $5_B$ displays the unique caller identifying information, for review by the user at station $1_B$, at the time when the user is deciding how to respond to the waiting call. During this time, the originating central office switching system $1_I$ has received the ACM message and applied ringback (S191), essentially as if the called party's line were free.

The party at the called station $1_B$ has several options for responding to the waiting call. To obtain a selected one of most of these options, the called party would input a selection (S193). The selection may involve a hookflash or a combination of a hookflash and dialed digit signaling on the station $1_B$, or the terminal $5_B$ may provide some other form of signaling. Processing branches in step S192 based on the response by the called party following the call waiting signal and associated caller ID display.

Assume first that the called party selected an option that involves answering the waiting call, either with the existing call terminated or with the existing call placed temporarily on hold. At this point in our example, the terminating central office switching system $11_N$ again sends an Answer Message (ANM) back to the originating central office $11_I$ through one or more of the STPs 15 (S194). The ANM message indicates that the called telephone $1_B$ was picked up. Also, at that time the actual telephone traffic trunk circuit is connected together between the central offices $11_I$ and $11_N$. The central offices 11 connect the lines to the stations to the respective ends of the trunk circuit, to complete the voice path. At this point, actual voice communication is established between the calling station $1_A$ and the called station $1_B$ (S195).

As noted, in step S192, the terminating central office $11_N$ may detect one of several conditions signifying alternative dispositions of the waiting call. The subscriber selection at S193 may indicate a specific selection, other than answering the call, such as a request to forward the call to another destination. Alternatively, the user may simply ignore the waiting call and continue the conversation on the existing, stable call. In any such case, the processing at step S192 branches to other processing steps at S196, after which the network performs the steps necessary to provide the other type of disposition of the waiting call, essentially as for existing call waiting or call waiting deluxe type services.

FIG. 4C is a simplified process and signal flow diagram, illustrating the call completion operations including, caller ID display involving access to name information in a central LIDB database. The network performs the steps depicted in FIG. 4C after identification of the subscriber, preferably based on speaker identification/verification (SIV). As in the example of FIG. 4B, the central office switch $11_I$ receives an instruction containing the subscriber's virtual office equipment (OE) number (step S14), loads the corresponding profile information in the register (step S15) and sends dial tone or the like over the line (step S16). The subscriber dials digits corresponding to the desired destination (step S17), and the switch in the central office $11_I$ transmits an IAM message through the interoffice signaling network to the terminating central office $11_N$. The information sent in or with the IAM message in step S201, however, is different than that sent in S181 in the earlier example.

In this embodiment, the originating end office $11_I$ reads a short code identifier from the identified subscriber's profile, currently loaded in the assigned register, and places that identifier in an additional field of the IAM message or in an accompanying information message addressed to the terminating office $11_N$. For example, if the network provides personal dial tone service to four identified persons associated with the originating telephone $11_I$ (e.g. in the dormitory room), then the short code might comprise a number from zero to three or one of several letters such as A, B, C and D, identified by the state of two bits in the IAM or accompanying information message.

As in the earlier example, the originating end office $11_I$ addresses and transmits the IAM message with the specific subscriber identifier code through the SS7 signaling network for receipt by the terminating office $11_N$. If the called party has only normal caller ID service, without the associated name service, then the terminating office $11_N$ would transmit a normal caller ID message to the destination, with the identifier appended to the calling party telephone number as an extra digit or character. If the called party often receives calls from this subscriber, even the limited subscriber specific identification provided by the code will enable the called party to recognize that the current call is from the identified subscriber. In accord with the invention, the network provides this subscriber specific caller ID information to called parties on ringing calls and when the called line is busy, if the called subscriber also has call waiting.

FIG. 4C depicts the processing steps, beginning in step S202, for processing a call to a called customer having the enhanced caller ID service for name and number display. In such a case, when the terminating office $11_N$ receives the IAM and the subscriber specific code, the administrative module processor in that office loads the profile for the called subscriber's telephone number into a register in the call store assigned to this call. Of particular note, because the called customer has the enhanced name and number type caller ID service, the customer profile record establishes a terminating attempt trigger (TAT) set against that customer's telephone number.

At this point, the terminating office $11_N$ recognizes the called party telephone number in the destination number field of the IAM message as a terminating attempt trigger (TAT) type point in call or PIC (step S202). In response to this PIC, the terminating office $11_N$ launches a TCAP query message through one or more of the STP(s) 15 to the LIDB database 21 (step S203). The query message includes both the telephone number associated with the calling station $1_A$ or its telephone line as well as the code identifying the specific subscriber making that call.

The LIDB database 21 uses the calling party telephone number and the code identifying the specific subscriber, received in the query, to retrieve that one subscriber's account file record from the database (S204). The query also indicates the cause of the query, i.e. the TAT triggering event. From this information, the LIDB database recognizes that the query is a request for name information. The database 21 therefore reads up to 15 characters of name data from the subscriber's account file. The LIDB database 21 compiles a TCAP call control type response message, including the name data, and returns that response message to the terminating central office $11_N$ via the SS7 network (S205).

The terminating central office switching system $11_N$ receives the call control message from the LIDB database 21. To provide the caller ID service in this embodiment, the terminating end office $11_N$ combines the name data from the call control message together with the calling party number as one or more caller ID messages, with the ringing signals if the line is available or with the CW alert signal if the called line is busy (and the subscriber has call waiting).

To process the subscriber's call and provide the identification in accord with the invention, the network again executes the steps S182-S196 essentially as discussed above. To complete the discussion of FIG. 4C, a summary of the operation of those steps follows.

The terminating CO $11_N$ determines if the called line is free (S182), and if so, its processing branches to step S183 at which point that CO sends the ACM message back to the central office $11_I$. The terminating CO $11_N$ also applies ringing signal to the called party's line (S183). The terminating central office $11_N$ transmits a caller ID signal over the line (S184), either as an ISDN signaling message or as an FSK data signal between the first ringing signal (S183) and the second ringing signal (S185).

In this example, the called party has enhanced caller ID for displaying name data (which required the triggering and access to the LIDB in S202-S205). The caller ID message applied to the called party's line therefore includes the telephone number associated with the calling station $1_A$ and the name information retrieved from the LIDB database 21. The ISDN telephone or the caller ID terminal $5_B$ receives and displays the number and the name data for the calling subscriber.

As noted, in step S183, the terminating central office switching system $11_N$ formulates and sends an ACM message. Since the called party line was free, the ACM sent in step S183 indicates the calling party line status as available. In response, the originating end office $11_I$ applies a ringback tone signal to the line to the calling station $1_A$ (S186). While the called party's station $1_B$ rings in response to the ringing signals and their associated caller ID display terminal $5_B$ shows the personalized caller ID, the calling party hears a ringing-like sound through their station $1_A$. If someone answers the telephone station $1_B$, the terminating CO $11_N$ detects that condition and signals the originating CO $11_I$. The central offices 11 connect the lines to the stations to the respective ends of the trunk circuit, to complete the voice path and enable voice grade communications between the parties.

Returning to step S182, recall that the terminating central office switching system $11_N$ determined first if the line to the called station was free. Assume now that the called line is busy (not free). Processing in step S182 therefore branches to step S187. In that step, the administrative module processor in the terminating central office switching system $11_N$ checks the called party's profile to determine if the called party subscribes to a call waiting service. If not, then the terminating CO $11_N$ sends an ACM message indicating busy condition, the originating CO $11_I$ provides a busy tone over the caller's line, and the call terminates in the normal manner for a 'busy' line condition (S188).

However, if the called party subscribes to call waiting service, processing in step S187 branches to step S189, instead. Here the terminating central office switching system $11_N$ transmits an Address Complete Message (ACM) indicating an available line back to the central office $11_I$, essentially in the same manner as in step S183. At the same time, the terminating central office switching system $11_N$ applies a call waiting (CW) alert tone to the existing call connection on the called party's line (S189). If the called party is an identified subscriber to the personal dial tone service, the alerting signal is distinctive and provides a user conversing on telephone station $1_B$ an indication of the identity of the called subscriber.

With the transmission of the call waiting alert signal, the terminating CO $11_N$ also sends a caller ID signal over the line (S190). In this example, the called subscriber has a deluxe service enabling caller ID with name information. The CO $11_N$ therefore sends an ISDN message or FSK signaling message containing the name and number information (S190) together with the alert signal. The caller ID terminal $5_B$ or a display device in the ISDN telephone displays the received number and name information, identifying the actual calling party. During this time, the originating central office switching system $11_O$ has received the ACM message and applied ringback (S191), essentially as if the called party's line were free.

The party at the called station $1_B$ has several options for responding to the waiting call. The user on the existing call at the station $1_B$ may ignore the waiting call or input a selection (S193) signifying one of the available disposition options. Processing branches in step S192 based on the response by the called party following the call waiting signal and associated caller ID display. Assume first that the called party selected an option that involves answering the waiting call, either with the existing call terminated or with the existing call placed temporarily on hold.

At this point in our example, the terminating CO $11_N$ again sends an Answer Message (ANM) back to the originating CO $11_I$ (S194). The ANM message indicates that the called telephone $1_B$ was picked up. Also, at that time the actual telephone traffic trunk circuit is connected together between the central offices $11_I$ and $11_N$. The central offices 11 connect the lines to the stations to the respective ends of the trunk circuit, to complete the voice path. At this point, actual voice communication is established between the waiting calling station $1_A$ and the called station $1_B$ (S195).

If the terminating CO $11_N$ detects some other disposition selection, because the subscriber input a different selection code or because the subscriber ignored the waiting call for some set period of time after the alert signal, processing in step S192 branches to the appropriate other call processing features (S196). The network disposes of the waiting call, in the manner selected by the user at the called station, in accord with existing call waiting procedures.

In the shared line example, each person normally expected to use the line to station $1_A$ is a different subscriber to the personal dial tone service. As the subscribers make outgoing calls, they each receive their own individualized service over the line on each separate call, in precisely the manner described above relative to steps S1 to S18 and the personal caller ID as described above relative to FIGS. 4B and 4C. For example, each subscriber may receive a different level of calling privileges and/or class of service based on their ability and/or desire to pay for telephone services. Also, the called party receives caller ID information including both the originating telephone number and the name or other identifying information associated specifically with the calling subscriber. The network provides the personalized caller ID information with ringing signals to available lines as well as with call waiting alert signals to busy lines of customers having the call waiting service with caller ID display.

Returning to step S13 in FIG. 4A, the extracted information characterizing the input speech signals may not match any of the templates or feature data used by the IP 23. In this event, the process flows to step S19. The IP will count the number of tries or attempts to identify the subscriber and permit some maximum number of failed attempts (N). Assume, for example, that the software allows only two identification attempts on one call (N=2). On the first failure, the number of tries is less than N, therefore processing returns to step S10, and the IP 23 again transmits the prompt for speech input. The caller again speaks the requested input information (S11), and the authentication module 233 again analyzes the input information (S12). If the second input adequately matches a stored subscriber's information in step S13, the processing flows through steps S14 to S18 to complete the call as described above.

However, if the extracted speech information does not match a stored subscriber template or feature data, processing again flows to step S19. If the number of tries now corresponds to the limit N, for example on the second failed attempt, the processing branches to step S20. The IP 23 may now transmit a message indicating denial of service, although this is optional. If provided, the message states that only a limited class of service is available in view of the problems in recognizing the caller as a known subscriber.

The IP 23 formulates a D-channel signaling message instructing the central office switch $11_I$ to process the call in accord with default conditions and transmits that instruction to the central office switch (step S21). The instruction could include a default OE number corresponding to a default profile, or the message could instruct the switch to proceed using the OE and profile data for the off-hook line itself. The IP 23 supplies the message to the SSP central office switch $11_I$ over the D-channel of the ISDN PRI link (step S21). The administrative module processor 61 resumes call processing using the appropriate default OE and profile.

In the preferred embodiment, the switch provides a normal dial tone (S22), collects dialed digits from the caller (S23) and processes the call (S24). However, the default profile provides only some limited class of service, for example only emergency 911 service or 911 service plus flat rate local calling. The default call processing provides no additional information from the profile corresponding to any particular subscriber, therefore the network processes the call as a normal call for caller ID purposes. The caller ID service will provide only the telephone number to callers having normal caller ID, and the network will access LIDB database 21 to provide name information if any associated strictly with the telephone number, essentially in the manner that the network provides such services when there is no personalized dial tone service involved.

In the above example, the network disconnected the IP 23 after identifying the subscriber and providing the subscriber's virtual OE number to the serving central office 11. For some applications of the personal dial tone service, the central office 11 would maintain a bridged connection of the IP 23 on the line, to enable the IP to monitor the call. For example, in a prisoner telephone service, each prisoner would have only limited telephone rights as specified in each prisoner's profile data. To prevent one prisoner from selling their telephone service rights to another prisoner, the IP 23 would periodically or constantly monitor the outgoing speech signals from the prison line. The voice authentication module 233 would initially identify the prisoner subscriber as discussed above, and would periodically recheck to authenticate the identity of the party using the prison line. If the voice authentication module detects some other party using the line or did not detect the identified subscriber's speech for some predefined time interval, the IP 23 would instruct the serving central office switch 11 to disconnect the call. The IP 23 may send messages to the switch or to other network elements to initiate additional action, such as profile modification to further limit a particular prisoner's telephone privileges and/or to notify prison authorities of misuse of telephone privileges.

In the above discussion of FIGS. 4A–4C, the personal dial tone service provided personalization of the call processing and associated caller ID functions, for an outgoing call from a subscriber to the personal dial tone service. As noted, the invention also enables personalization of incoming call related functions, for calls to a subscriber to the personal dial tone service. In particular, the network will provide a distinctive ringing or a distinctive call waiting signal, to uniquely identify one of several subscribers available via a particular communication link. This enables persons at the premises served through the link to recognize the identity of an individual subscriber as the intended called party or recipient, on incoming calls. To understand how the network provides these distinctive alerting services, it may be helpful to consider a call processing example in somewhat more detail.

Figure 5A:
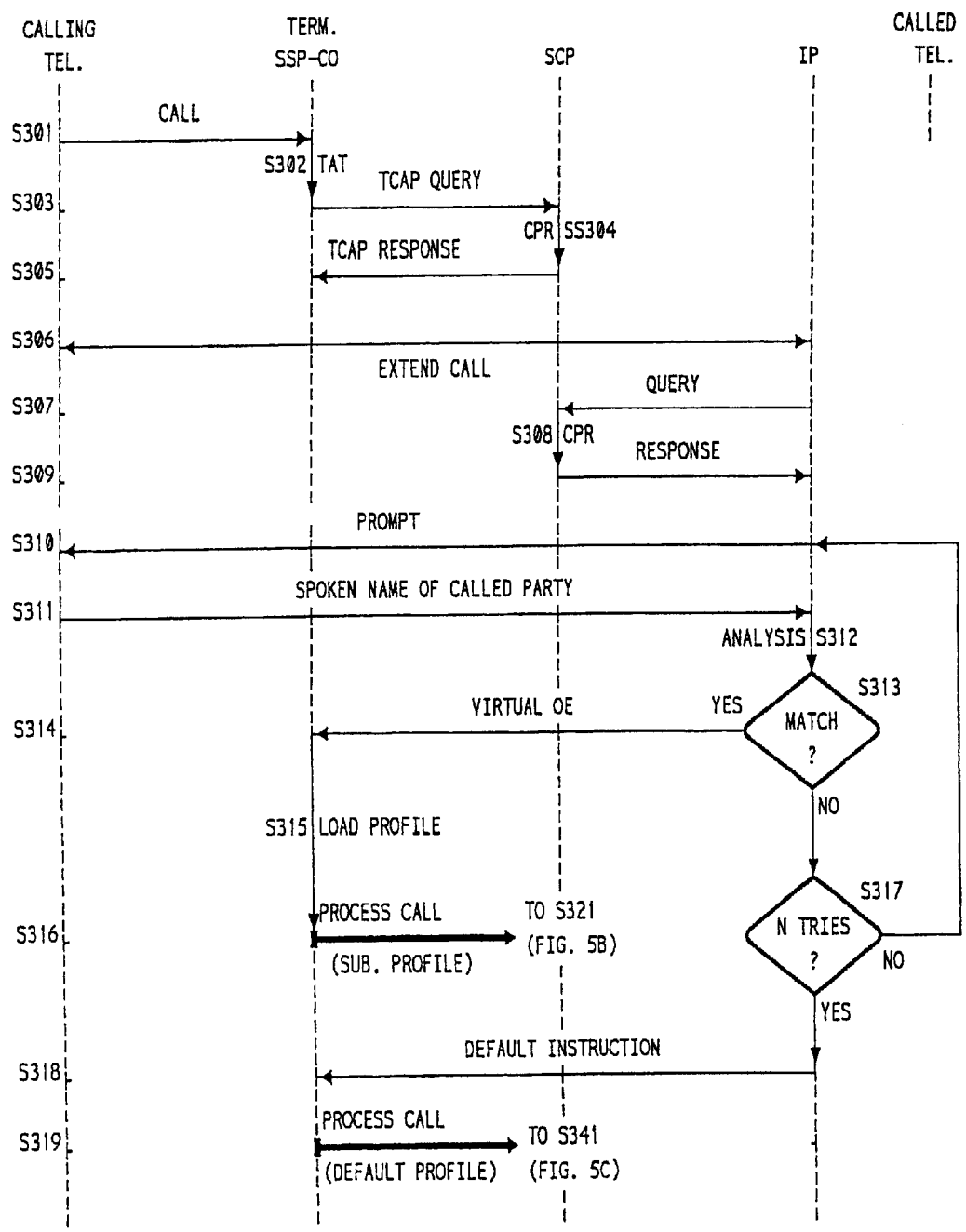
FIGS. 5A, 5B and 5C together form a combination signal flow and process flow diagram useful in understanding a specific example of call processing for providing the personalized alerting, on incoming ringing calls and for waiting calls to the subscriber.
Figure 6:
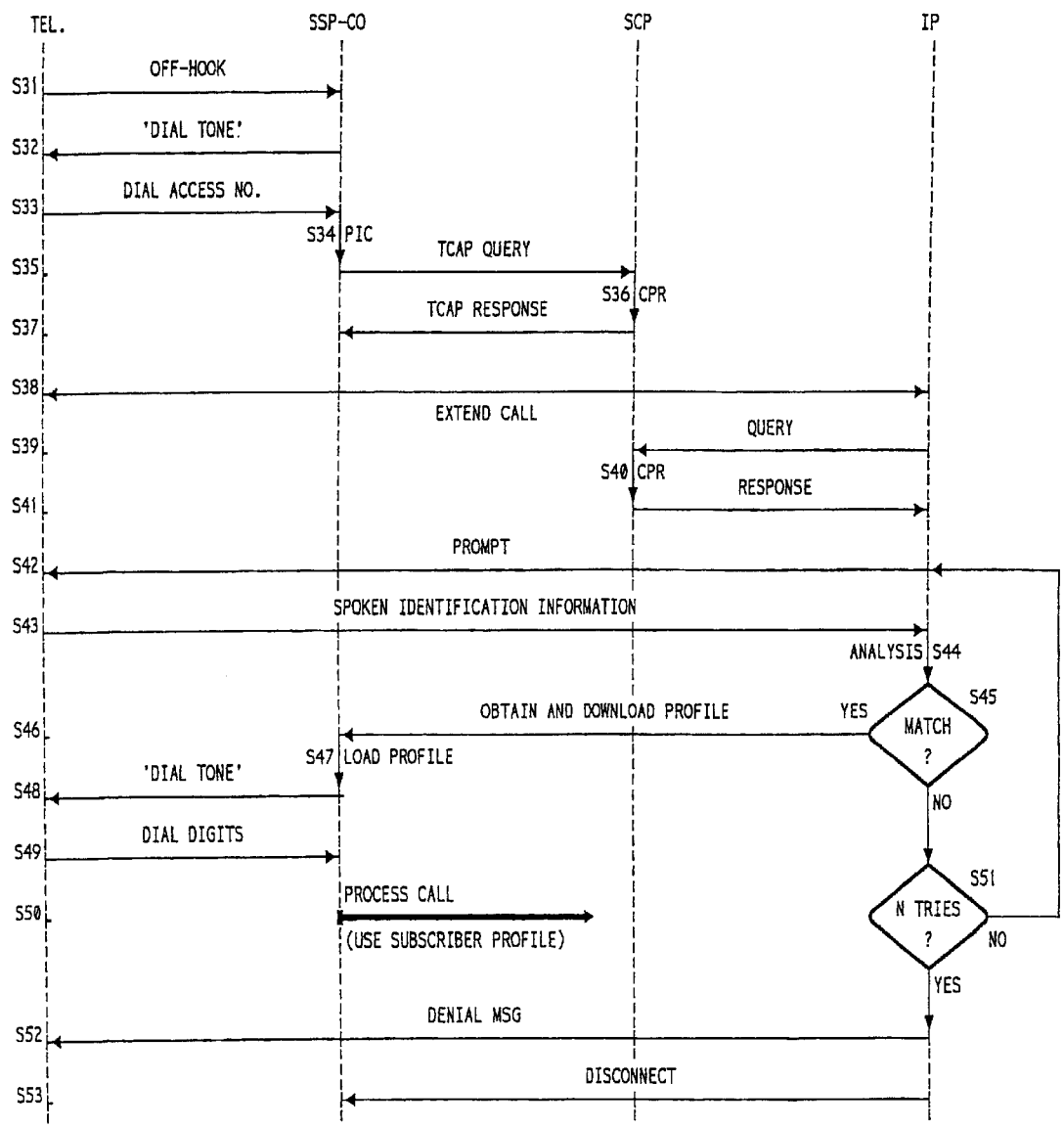
FIG. 6 is a combination signal flow and process flow diagram useful in understanding a specific example of call processing for providing the personal dial tone service on a dial-up, per call basis.

For this example, assume that two or more persons using the station $1_B$ individually subscribe to the personal dial tone service. This may be an established, shared-use situation, such as a dormitory room, a family with teenage children, a residence and work-at-home scenario, or the like. Alternatively, a visiting subscriber may have instructed the network to associate their personal dial tone service with the line to that station for some predetermined period, as discussed in more detail later with regard to FIG. 6. On incoming calls for the line to station $1_B$, the network therefore attempts to identify a called subscriber and process the call using that subscriber's profile. FIG. 5A provides a simplified flow diagram of the signal flow and processing for such an incoming call.

For purposes of this example, assume that a user at calling station $1_A$ attempts to call one of several subscribers, who may use the station $1_B$. The caller may have personal dial tone service, in which case, the network processes the call in the manner discussed above relative to FIG. 4A. For purposes of this discussion, however, assume that the caller is a normal telephone service customer, without personal dial tone service. The person lifts the handset of telephone $1_A$ creating an off-hook state, and the originating central office $11_I$ detects the off-hook and provides a standard dial tone. The caller dials digits, and the originating CO $11_I$ initiates its procedures to complete the call.

In the interoffice type call of the present example, the originating CO $11_I$ initiates interoffice signaling to the terminating central office $11_N$, for example by sending an Initial Address Message through the interoffice signaling network. When the signaling indicates to the terminating central office $11_N$ that there is an incoming call for the destination number (S301), the terminating CO retrieves the default profile associated with the called telephone number. In this case, the profile includes a terminating attempt (TAT) type trigger set against the particular telephone number. The serving SSP type office $11_N$ therefore detects when call processing in response to the IAM message reaches the point in call (PIC) corresponding to the TAT trigger (step S302).

Upon detecting the TAT trigger, the terminating central office $11_N$ suspends processing of the incoming call and launches a TCAP query to the SCP 19 (S303). The query includes information regarding the call, such as the type of trigger (e.g. TAT) and the dialed destination number. In response to the query, the SCP 19 accesses its internal database, typically, the MSAP database set up in the ISCP, to determine how to process the particular call. In this example, the SCP 19 recognizes the TAT trigger type and uses the dialed destination number as a service key. Using that number key, the SCP 19 retrieves a call processing record (CPR) corresponding to the shared telephone number dialed by this caller (S304). The CPR is generic in the sense that it applies for all calls to the shared number.

For the present example of the personal dial tone service, the CPR will provide information necessary for routing the call to some node of the network that will perform an announcement and input collection procedure, to enable the caller to select one of the subscribers as the actual called party. In the preferred embodiment, this is another function performed by an Intelligent Peripheral (IP), therefore the CPR provides information for routing the call to the nearest available IP 23 having the appropriate capability.

Based on the CPR, the SCP 19 formulates a response message instructing the SSP central office $11_N$ serving the called subscriber station $1_B$ to route the call. In this case, the message includes information, e.g. an office equipment (CE) number or telephone number, used for routing a call to the identified IP 23. The SCP 19 formulates a send-to-outside-resource type TCAP response message in SS7 format, with the destination point code identifying the SSP office $11_N$. The SCP 19 transmits the TCAP response message back over an SS7 link to the STP 15, and the STP 15 in turn routes the TCAP message to the terminating SSP central office $11_N$ (see step S305).

The SSP type switch in the central office $11_N$ uses the routing information to connect the call to one of the lines or channels to the IP 23, either directly if such a link is available or through one or more of the other offices 11. A two-way voice grade call connection now extends between the calling station $1_A$ and the IP 23 (step S306).

As noted above, the communication link to the IP 23 provides both line connections and signaling, preferably over a primary rate interface (PRI) type ISDN link. When the central office $11_N$ extends the call from the calling party's line to a line circuit (over a B channel) to the IP 23, the switch(es) also provides call related data over the signaling link (D channel for ISDN) to the IP 23. The call related data, for example, includes the dialed destination telephone number.

In response to the incoming call, the IP 23 will seize the line, and it will launch its own query to the SCP 19 (step S307). In the preferred network illustrated in FIG. 1, the IP 23 and the SCP 19 communicate with each other via the signaling network 27, using either the 1129+ protocol or the generic data interface (GDI) protocol. The query from the IP 23 at least identifies the called telephone number.

In response to the query from the IP 23, the SCP 19 again accesses the appropriate CPR (step S308) and provides a responsive instruction back through the network 27 to the IP 23 (step S309). For an incoming call to a number associated with the personal dial tone service, the instruction causes the IP 23 to initiate a routine for playing prompts to the caller and collecting input information. The instruction to the IP 23 will include any information needed to enable the IP 23 to complete its processing of the call, in this case a textual list of the subscribers associated with the dialed destination number.

Although the IP 23 could collect inputs as dialed digits, preferably the IP recognizes selection information in speech signals from the caller. Initially, in response to the instruction from the SCP 19, IP 23 plays a prompt message over the connection to the caller (S310), for example asking the caller to speak the full name of the called party. The signal generated by the IP 23 goes over the lines and through the central office switch(es) 11 for presentation via the off-hook telephone $1_A$ to the calling party. In response, the caller will speak identifying information, typically the name, of the person that they are calling. The network will transport the audio signal to the IP 23 (step S311).

As noted above, an IP 23 can provide a wide range of call processing functions, such as message playback and digit collection. In the preferred system, the IP also performs speech recognition on the audio signal received from the calling telephone in step S311. When the IP 23 receives speech input information during actual call processing, for this service example, the IP analyzes the speech to identify corresponding textual information (S312).

For purposes of the incoming call processing, the instruction from the SCP received in step S309 includes name or other identifying information for the subscribers associated with the number dialed on the present incoming call. Typically, this information will be name information, specified as text data. The speech recognition module 234 in the IP 23 compares the results of the analysis of the received speech to the name data for the subscribers associated with the dialed number, to determine if the input speech matches any of the names within a predetermined threshold level (S313). If there is a match, the IP now knows the identity of the called subscriber.

Based on the identification of the called subscriber, the IP 23 selects a virtual office equipment (OE) number that corresponds to that subscriber, from storage. The IP 23 formulates a D-channel signaling message containing the virtual office equipment (OE) number together with an instruction to load that OE number into the register assigned to the call in place of the OE number of the called party's line. The IP 23 supplies the message to the SSP central office switch $11_N$ over the D-channel of the ISDN PRI link and any additional links between the IP and the particular CO 11 (step S314). In response, the administrative module processor 61 in the CO $11_N$ writes to the OE number portion of the register assigned to the call with the OE number received from the IP 23.

Upon entering the OE number in the register, the administrative module processor 61 of central office switch $11_N$ also reloads the profile information in the register (step S315). Specifically, the administrative module processor 61 retrieves profile information associated with the virtual office equipment (OE) number for the called subscriber from the disc storage 63 into the register. As such, the profile information in the assigned register in the call store 67 now corresponds to the called identified subscriber, rather than to the called telephone number.

The profile information provides a wide range of data relating to the called subscriber's services. In accord with this aspect of the invention, the identified subscriber's profile data provides information for distinctive alerting, preferably for both ringing and call waiting alert signaling. The profile data typically provides other information, used for processing incoming calls, such as call forwarding information, incoming call restriction features or the like. The profile also defines various service features available to this subscriber on incoming calls, in particular that this exemplary customer subscribes to call waiting.

In the presently preferred implementation, when the central office switch $11_N$ reloads the profile, the central office disconnects the link to the IP 23. The central office $11_I$ utilizes the subscriber's profile data to further process the call (S316). Although a line appears for the called station in FIG. 5A, it should be noted that to this point there has been no signaling to that station. For purposes of our discussion, step S316 initiates the processing illustrated in FIG. 5B at step S321, which for example results in various signaling to the called party station $1_B$.

Figure 5B:
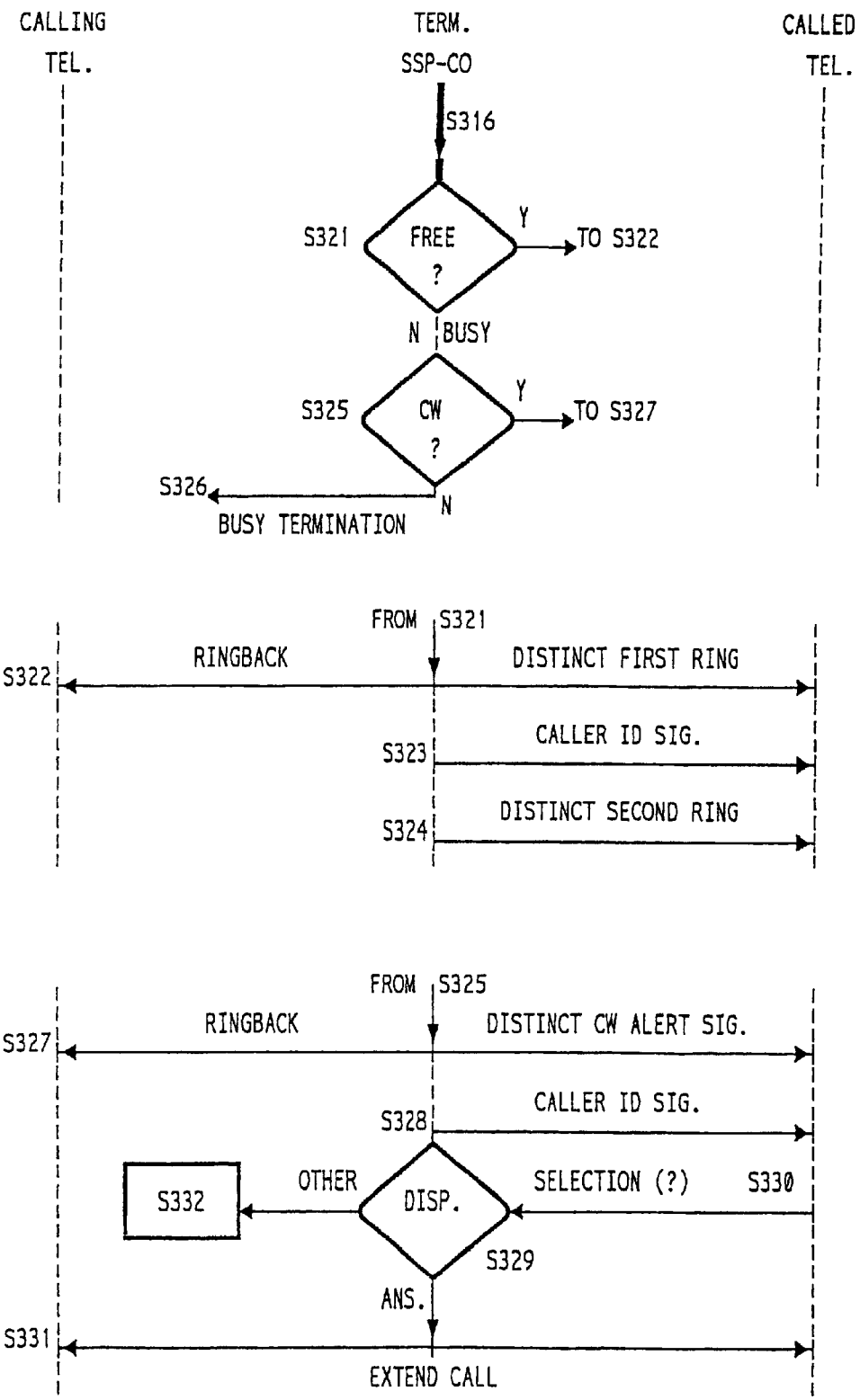

FIG. 5B is a simplified process and signal flow diagram, illustrating the call completion operations, in somewhat more detail. The network performs the steps of FIG. 5B as part of the call completion processing of step 316 of FIG. 5A. As such, at the start of the processing of FIG. 5B, the call has reached the terminating central office $11_N$, and the administrative module processor 61 in that office has loaded the identified called subscriber's profile into the terminating subscriber portion of the register in call store 67 assigned to processing of this call.

The terminating central office switching system $11_N$ first determines if the called line is free (S321). If so, processing branches to step S322. In this case, the voice path for this call already extends through terminating central office switching system $11_N$ (see step S311 in FIG. 5A). The terminating central office switching system $11_N$ itself applies ringback through the voice path to the calling party's telephone station $1_A$ (S322). At approximately the same time, the terminating CO $11_N$ applies a ringing signal to the called party's line (S322).

In accord with the invention, the ringing signal applied to the called party's line in step S322 is a distinctive ringing signal. The identified subscriber's profile loaded into the register in the call store specifies one of several available ringing signals, e.g. having different cadences, for use for calls to the particular identified subscriber. Consequently, the ring generated by the telephone station(s) $1_B$ at the called party's premises rings in a distinctive manner alerting persons on the premises that the current call is directed to the one subscriber selected by the caller in the speech input step S311.

As part of its operations to ring the called telephone station, the terminating central office $11_N$ preferably transmits a caller ID signal over the line (S323), either as an ISDN D-channel signal or as FSK data signals interspersed between the first and second ringing signals. The terminating CO applies a second and possibly subsequent distinctive ring signals to the line (S324) until someone answers the call, or the caller hangs up, or until the call rolls-over into voice mail (if available for the called subscriber).

If the caller has only normal dial tone service, the caller ID display includes at least the telephone number for the line to the calling station $1_A$. Although the steps were not separately shown, if the called subscriber has a name and number based caller ID service, such as caller ID deluxe, the network obtains the billing subscriber's name information from the LIDB 21 and supplies that name with the telephone number for the caller ID in step S323. However, if the caller is a personal dial tone subscriber, the caller ID provided in step S323 includes the name or other identifying information unique to the particular calling party, in the manner discussed above relative to FIGS. 4A to 4C.

As noted, in step S322, the terminating central office switching system $11_N$ sends a ringback tone to the calling party station $1_A$. While calling party hears a ringing-like sound through their station, the called party's station $1_B$ rings in a distinctive manner and preferably their associated caller ID display terminal $5_B$ shows the caller ID. Although the steps are not shown, for convenience, if someone answers the telephone station $1_B$, the terminating central office switching system $11_N$ detects an off-hook condition and connects the called party's line to the voice channel circuit back to the calling party's station $1_A$. Communication continues until one or both parties hang up, at which time, all of the switched connections are torn down.

Returning to step S321, recall that the terminating central office switching system $11_N$ determined first if the line to the called station was free. Assume now that the called line is busy (not free). Processing in step S321 therefore branches to step S325. In that step, the administrative module processor 61 in the terminating central office switching system $11_N$ checks the identified called subscriber's profile to determine if that subscriber has a call waiting service. If not, then the terminating central office switching system $11_N$ sends a busy tone through the network to the caller's line, and the call terminates in the normal manner for a 'busy' line condition (S326).

However, if the called party subscribes to call waiting service, processing in step S325 branches to step S327, instead. Here the terminating central office switching system $11_N$ itself transmits ringback through the voice path to the calling party's telephone station $1_A$ (S327). At approximately the same time, the terminating CO $11_N$ applies a call waiting (CW) alert tone to the existing call connection on the called party's line (S327).

In accord with the invention, the CW alert signal applied to the called party's line in step S327 is a distinctive signal. The identified subscriber's profile loaded into the register in the call store specifies one of several available alerting signals, e.g. having different cadences, or different frequencies, etc., for use for waiting calls to the particular identified subscriber. Consequently, the CW alert signal presented through the earpiece of the off-hook telephone station $1_B$ uniquely identifies the called subscriber to the person using that off-hook telephone station.

As part of its operations to provide the call waiting service, the terminating central office $11_N$ preferably transmits a caller ID signal over the line (S328), either as an ISDN D-channel signal or as FSK signals, as discussed above. The caller ID signals include at least a telephone number and preferably a name. As in the earlier example, the name information may be generic to the calling telephone number, if the caller has only normal dial tone service. If the caller has personal dial tone service, the name included in the caller ID signal in step S328 identifies the actual calling party.

While the person using the called station $1_B$ hears the distinctive call waiting alert signal, the calling party hears ringback in the normal manner. The party at the called station $1_B$ has several options for responding to the waiting call. Step S329 provides a branch in the process flow to various optional terminations. To obtain a selected one of most of these options, the called party may input a selection (S330). The selection may involve a hookflash or a combination of a hookflash and dialed digit signaling on the station $1_B$, or the terminal $5_B$ may provide some other form of signaling. Processing branches in step S329 based on the response by the called party following the call waiting signal and associated caller ID display.

Assume first that the called party selected an option that involves answering the waiting call, either with the existing call terminated or with the existing call placed temporarily on hold. At this point in our example, the terminating central office switching system $11_N$ connects the waiting call to the line to the destination station $1_B$.

As noted, in step S329, the terminating central office $11_N$ may detect one of several conditions signifying alternative dispositions of the waiting call. The subscriber selection at S330 may indicate a specific selection, other than answering the call, such as a request to forward the call to another destination. Alternatively, the user may simply ignore the waiting call and continue the conversation on the existing, stable call. In any such case, the processing at step S329 branches to other processing steps at S332, after which the network performs the steps necessary to provide the other type of disposition of the waiting call, essentially as for existing call waiting or call waiting deluxe type services.

Returning to step S313 in FIG. 5A, the speech input analyzed for recognition purposes may not match any of the names or other subscriber identifying data corresponding to the dialed destination number. In this event, the process flows to step S317. The IP 23 will count the number of tries or attempts to identify the subscriber and permit some maximum number of failed attempts (N). Assume again, for example, that the software allows only two identification attempts on one call (N=2). On the first failure, the number of tries is less than N, therefore processing returns to step S310, and the IP 23 again transmits a prompt for speech input. The caller again speaks the requested input information (S311), and the speech recognition module 235 again analyzes the input information (S312). If the second input adequately matches a stored subscriber's information in step S313, the processing flows through the steps S315 and S316 and the steps starting at S321 in FIG. 4B to complete the call as described above.

However, if the processed speech input does not match the identification information for one of the subscribers associated with the called telephone number, processing again flows to step S317. If the number of tries now corresponds to the limit N, for example on the second failed attempt, the processing branches to step S318. The IP 23 could now transmit a message indicating denial of service, for example if the subscribers had some type of privacy service denying access to unknown callers who do not select one of the subscribers. However, in the preferred embodiment, the calls still should be completed, but using default profile information. Accordingly, in the next step S318 the IP 23 formulates a D-channel signaling message instructing the central office switch $11_N$ to process the call in accord with default conditions and transmits that instruction to the central office switch (S318). The instruction could include a default OE number corresponding to a default profile, but preferably the message instructs the switch to proceed using the OE and profile data for the dialed telephone number. The IP 23 supplies the message to the SSP central office switch $11_N$ over the D-channel of the ISDN PRI link. The administrative module processor 61 resumes call processing using the appropriate default OE and profile. Typically this profile is the same profile loaded in response to the IAM message received from the originating CO.

In the presently preferred implementation, when the central office switch $11_N$ resumes processing using the default profile, the central office disconnects the link to the IP 23. The central office $11_I$ utilizes the default profile data to further process the call (S319). Although a line appears for the called station in FIG. 5A, again it should be noted that to this point there has been no signaling to that station up through the resumption of processing based on the default profile. For purposes of our discussion, step S319 initiates the processing illustrated in FIG. 5C at step S341, which for example results in various signaling to the called party station $1_B$.

Figure 5C:
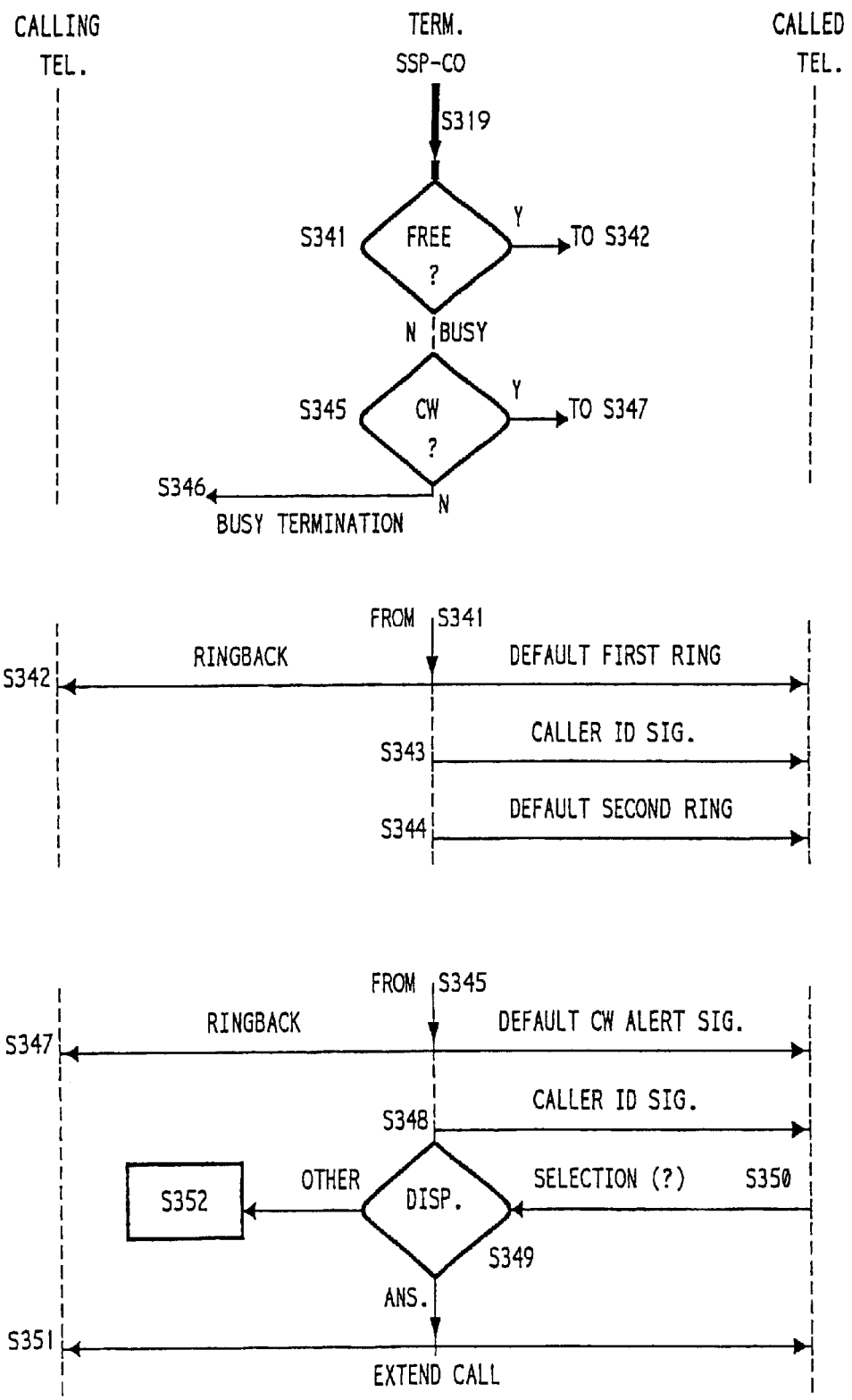

FIG. 5C is a simplified process and signal flow diagram, illustrating the call completion operations, where the caller has failed to selected one of the subscribers associated with the dialed telephone number. The network performs the steps of FIG. 5C as part of the call completion processing of step 319 of FIG. 5A. As such, at the start of the processing of FIG. 5C, the call has reached the terminating central office $11_N$, and the administrative module processor 61 in that office has loaded the default profile, preferably the profile corresponding to the dialed telephone number, into the terminating subscriber portion of the register in call store 67 assigned to processing of this call.

The terminating central office switching system $11_N$ first determines if the called line is free (S341). If so, processing branches to step S342. In this case, the voice path for this call already extends through terminating central office switching system $11_N$ (see step S311 in FIG. 5A). The terminating central office switching system $11_N$ itself applies ringback through the voice path to the calling party's telephone station $1_A$ (S342). At approximately the same time, the terminating CO $11_N$ applies ringing signal to the called party's line (S342).

In this case, however, no specific subscriber has been identified. The network is using the default profile. Accordingly, the ringing signal applied to the called party's line in step S342 is a default ringing signal. The default profile loaded into the register in the call store specifies one of the available ringing signals, e.g. having different cadences, for use for the default condition. Preferably, the default ringing signal is the normal ringing signal used by the telephone network. Alternatively, the default ringing signal could be a distinctive ringing signal, but one not assigned to an individual subscriber who uses the station $1_B$. In either case, the ring sound generated by the telephone station(s) $1_B$ at the called party's premises rings in a manner alerting persons on the premises that the current call is not specifically directed to any one of the subscribers but is directed generically to their shared telephone number. Individuals may personally decide whether or not to answer such calls.

As part of its operations to ring the called telephone station, the terminating central office $11_N$ preferably transmits a caller ID signal over the line (S343), as discussed above relative to step S323 in FIG. 5B. The terminating CO applies a second and possibly subsequent distinctive ring signals to the line (S344) until someone answers the call, or the caller hangs up or until the call rolls-over into voice mail (if available via the default profile).

As noted, in step S342, the terminating central office switching system $11_N$ sends a ringback tone to the calling party station $1_A$. While calling party hears a ringing-like sound through their station, the called party's station $1_B$ rings in a manner signifying the default condition, but preferably their associated caller ID display terminal $5_B$ shows the caller ID with name information. Although the steps are not shown, for convenience, if someone answers the telephone station $1_B$, the terminating central office switching system $11_N$ detects an off-hook condition and connects the called party's line to the voice channel circuit back to the calling party's station $1_A$. Communication continues until one or both parties hang up, at which time, all of the switched connections are torn down.

Returning to step S341, recall that the terminating central office switching system $11_N$ determined first if the line to the called station was free. Assume now that the called line is busy (not free). Processing in step S341 therefore branches to step S345. In that step, the administrative module processor 61 in the terminating central office switching system $11_N$ checks the identified called subscriber's profile to determine if that subscriber has a call waiting service. If not, then the terminating central office switching system $11_N$ sends a busy tone through the network to the caller's line, and the call terminates in the normal manner for a 'busy' line condition (S346).

However, if the called party subscribes to call waiting service, processing in step S345 branches to step S347, instead. Here the terminating central office switching system $11_N$ itself applies ringback through the voice path to the calling party's telephone station $1_A$ (S347). At approximately the same time, the terminating CO $11_N$ applies a call waiting (CW) alert tone to the existing call connection on the called party's line (S347).

In this case, the profile for the terminating station is the default profile. The default profile identifies a corresponding default alert signal for call waiting services. The default alert signal may be a distinctive alert signal assigned to no specific subscriber, but preferably the default alert signal is the normal call waiting tone. The CW alert signal presented through the earpiece of the off-hook telephone station $1_B$ in step S347 indicates to the user that there is a waiting call but that the caller has not selected a specific one of the subscribers. The user makes a personal decision how to respond to the waiting call based on knowledge that this caller did not select a subscriber.

As part of its operations to provide the call waiting service, the terminating central office $11_N$ preferably transmits a caller ID signal over the line (S348), as discussed above relative to step S328 in FIG. 5B. While the person using the called station $1_B$ hears the call waiting alert signal for the default condition, they can also view the telephone number and preferably associated name information on the display terminal $5_B$. At the same time, the calling party hears ringback in the normal manner.

Again, the user at the called station $1_B$ has several options for responding to the waiting call. Step S349 provides a branch in the process flow to various optional terminations.

To obtain a selected one of most of these options, the called party may input a selection (S350). The selection may involve a hookflash or a combination of a hookflash and dialed digit signaling on the station $1_B$, or the terminal $5_C$ may provide some other form of signaling. Processing branches in step S349 based on the response by the called party following the call waiting signal and associated caller ID display.

Assume first that the called party selected an option that involves answering the waiting call, either with the existing call terminated or with the existing call placed temporarily on hold. At this point in our example, the terminating central office switching system $11_N$ connects the waiting call to the line to the destination station $1_B$.

As noted, in step S349, the terminating central office $11_N$ may detect one of several conditions signifying alternative dispositions of the waiting call. The subscriber selection at S350 may indicate a specific selection, other than answering the call, such as a request to forward the call to another destination. Alternatively, the user may simply ignore the waiting call and continue the conversation on the existing, stable call. In any such case, the processing at step S349 branches to other processing steps at S352, after which the network performs the steps necessary to provide the other type of disposition of the waiting call, essentially as for existing call waiting or call waiting deluxe type services.

To see some of the advantages of the present invention, it may be helpful to reconsider the example in which a family has one line with a distinctive ringing service and distinctive alerting with call waiting service. Using the invention, this service requires only one telephone number. When each member of the family makes an outgoing call, the network identifies the specific caller as a subscriber and provides the corresponding personalized dial tone service, in the manner described above. For example, if the teenager calls a friend whose family has caller ID, the caller ID display device at the friend's house will receive and display the one telephone number for the caller's home, whether the called station rings if available or provides a call waiting alert tone if engaged in a stable call. However, with that caller ID number, the display device will receive and present at least some subscriber specific caller ID information identifying the calling teenager. Preferably, the caller ID information displayed will include the actual name of the calling teenager.

If the friend calls back using the information from his caller ID display terminal, the friend calls the family's one telephone number. In this example, however, the network prompts the caller to speak the name of the actual called party. The friend can speak the name of the teenager, preferably by reading the name from the caller ID display, and the network will recognize that name. The switching office loads the appropriate profile, applies the profile processes the call accordingly. For example, if the line is free, the switching office applies a distinctive ringing signal to the family's line, so that people in the household know that the incoming call is for the teenager. If home, the teenager will personally answer the call. Other family members may elect not to answer the call for the teenager. If the line is busy at the time of call-back, the switch applies a call waiting alert signal to the audio channel. In accord with the invention, the alert signal also is distinctive, and indicates to the current user that the waiting call is intended for the teenager. If the user is the teenager, she may choose to answer the waiting call. Other users may elect to ignore the waiting call for the teenager.

The same kind of personal dial tone service, with subscriber specific caller ID, distinctive ringing and distinctive alert for call waiting, can be used to facilitate work at home or a home business. In such a case, the family members who subscribe to the service speak their names and the home business person would speak his personal name, on any outgoing family calls, to receive normal home telephone services on such calls. The network will provide services, bill for the calls and provide subscriber specific caller ID, based on the family members' profiles. Callers would input the name of an individual family member or the last name of the family, to initiate processing of incoming calls in accord with the family's profile(s). The end office switch would apply a corresponding distinctive ring signal or distinctive call waiting alert signal on all such incoming calls.

For outgoing business calls, however, the home business person would speak the name of the business. The network will provide services, bill for the calls and provide subscriber specific caller ID based on the business profile. Called parties will receive specific caller ID displays identifying the business, e.g. by the company name, for ringing calls and with appropriate call waiting services. When persons call the business, the network will prompt for an input and receive the name of the business. The network will process such incoming calls using the business profile, for example to apply distinctive ringing or distinctive call waiting alert, or to route calls to the appropriate voice mail box, e.g. when a waiting call goes unanswered.

The detailed examples discussed above related to personal dial tone service provided on a per-call basis on a shared use line. Several known subscribers might routinely use their personal dial tone services over the same line. As noted earlier, an alternate form of the personal dial tone service can be activated on a dial-up basis. Consider now an example of a dial-up activation for a single call.

For this example, assume that a subscriber's normal or 'home' telephone is telephone $1_B$. The end office switch $11_N$ stores the subscriber profile data for the line associated with that telephone station. Now assume that the subscriber is using station $1_A$ connected through a telephone line to central office $11_I$. FIG. 5 provides a simplified flow diagram of the signal flow and processing for such a call.

The subscriber lifts the handset creating an off-hook state in the telephone $1_A$ and a signal to office 11 (step S31). The serving central office $11_I$ detects the off-hook and commences its call processing. Specifically, the central office assigns a register in the call store 67 to this call and loads profile information associated with the off-hook line from the disc storage 63 into the register. In this case, the profile data associated with the line does not provide an off-hook trigger because the line is not specifically associated with the shared use type personal dial tone service discussed above. The central office $11_I$ therefore provides dial tone in the normal manner (step S32).

If making a normal call, the caller would dial a destination number, and the network would complete the call as dialed. To activate the personal dial tone service, however, the subscriber dials an access number assigned to that service, such as 1-800-DIALTON, from the station $1_A$ (step S33).

The dialing of an outgoing call, in this case to the access number, is another type of service request. The central office switch $11_I$ recognizes the dialed access number as a trigger event or 'PIC' (step S34). The trigger here is a dialed number trigger, such as the 800 number trigger or a 3/6/10 trigger. In response to the PIC for this triggering event, the SSP type central office $11_I$ creates a TCAP query message containing relevant information, such as the office equipment (OE)

number and/or telephone number assigned to the off-hook line, the dialed number and the type of triggering event. The office $11_I$ transmits that query to the SCP 19 (step S35). Specifically, the SSP central office $11_I$ transmits the query over an SS7 link to one of the STPs 15. The query includes a point code and/or a global title translation addressing the message to the SCP 19, and the STP 15 relays the query message over the appropriate link to the SCP 19.

In response to a query, the SCP 19 accesses its database to determine how to process the particular call. In this case, the query indicates the dialed number type trigger and provides the digits of the specific number dialed. The SCP 19 uses the dialed number as the access key. The SCP 19 retrieves a call processing record (CPR) corresponding to that number associated with the personal dial tone access function (step S36). For the current exemplary access, the CPR will provide information necessary for routing the call to the IP 23 that will perform the necessary speaker identification/verification (SIV).

Based on the CPR, the SCP 19 formulates a response message instructing the SSP central office $11_I$ serving the customer to route the call. In this case, the message includes information, e.g. an office equipment (OE) number or telephone number, used for routing a call to the identified IP 23. The SCP 19 formulates a TCAP response in SS7 format and transmits the TCAP response message back to the SSP central office $11_I$ (see step S37).

The SSP type switch in the central office $11_I$ uses the routing information to connect the call to a line or channel to the IP 23. A voice grade call connection now extends between the calling station $1_A$ and the IP 23 (step S38).

The central office $11_I$ provides a signaling message to the IP 23 with the call. In this case, the signaling message includes the dialed digits indicating a call to the personal dial tone access number. The signaling message also includes either the office equipment number or the telephone number of the line to the calling station $1_A$.

As in the earlier examples, the IP 23 will seize the line for the incoming call and launch a query to the SCP 19 through the TCP/IP network 27 (step S39). The SCP 19 accesses an appropriate CPR (S40), and based on that CPR, the SCP 19 transmits back a message (S41) instructing the IP 23 to execute a program or script, in this case for the dial-up access to the personal dial-tone service.

The IP initially plays a greeting and a prompt message (S42) and collects spoken input information (S43). The IP 23 may also play a prompt and collect digits representing the subscriber's normal or home telephone number. The voice authentication module 233 analyzes the spoken identification information to extract characteristic information (S44) and compares the extracted information to stored template or feature data to determine if there is an adequate match to the known subscriber data (S45), as in the earlier example.

In step S45, the IP 23 determines if the information extracted from the speech input matches any of the stored template data feature data for an identifiable subscriber. If there is a match with an acceptable level of confidence, the IP now knows the identity of the calling subscriber. Based on the identity of the subscriber, the IP 23 obtains the subscriber's profile data from the central office $11_N$ serving the subscriber's home telephone line. If the IP 23 is in direct signaling communication with the home central office $11_N$, for example via an ISDN D-channel or an SMDI link, the IP 23 may directly request and receive the profile data over the signaling link. If the IP and the switch are not in direct communication, the IP may provide a message notifying the SCP 19, and the SCP 19 would obtain the data from the switch and provide it back to the IP 23. As discussed with regard to the earlier examples, the subscriber profile includes at least some subscriber specific identifying information, typically used to facilitate subscriber specific caller ID. The profile also indicates if the subscriber has call waiting, and if so, identifies the subscriber's distinctive alerting signal for call waiting.

The IP 23 formulates one or more D-channel signaling messages containing the subscriber's profile information together with an instruction to load that information into the register assigned to the call in place of the profile information corresponding to the off-hook line (step S46). The IP 23 supplies the message(s) to the SSP central office switch $11_I$ over the D-channel of the ISDN PRI link. In response, the administrative module processor 61 rewrites the profile data in the register assigned to the call using the data from the IP 23 (step S47). As such, the profile information in the assigned register now corresponds to the identified subscriber.

When the central office switch $11_I$ reloads the profile, the central office disconnects the link to the IP 23 and connects tone receivers to the caller's line. The central office $11_I$ may also provide a standard dial tone or other message over the line (step S48). The caller can now dial digits in the normal manner (step S49), and the switch in the central office $11_I$ will load the dialed digits into the assigned register within the call store 67. The central office $11_I$ utilizes the dialed digits and the subscriber's profile data to process the call (step S50). For example, the switch in central office $11_I$ may provide the appropriate record to bill the outgoing call to the subscriber's account. In accord with the invention, the network also provides the subscriber specific information for caller ID purposes with the ringing signals or the call waiting alert signal, in the manner discussed in detail above relative to either FIG. 4B or FIG. 4C.

As in the earlier example, the preferred embodiment allows up to N tries or attempts to provide recognizable subscriber identification information. Thus, if in step S45 the extracted information characterizing the input speech signals did not match any of the templates or feature data used by the IP 23, then the process flows to step S51. If the current number of attempts for recognition on this call is less than N, processing returns to step S42, and the IP 23 again transmits the prompt for speech input. The caller again speaks the requested input information (S43), and the authentication module 233 again analyzes the input information (S44). If the second input adequately matches a stored subscriber's information S45, the processing flows through steps S46 to S50 to complete the call as described above.

However, if the extracted speech information does not match a stored subscriber template or feature data, processing again flows to step S51. If the number of tries now corresponds to the limit N, the processing branches to step S52. The IP 23 preferably transmits a message indicating denial of service (S52), and then transmits a message to the central office $11_I$ signifying disconnection of the access call (S53). It should be noted that, in this example, normal service provided over the line to station $1_A$ is available on a subsequent call. The failure to recognize the caller as a personal dial tone subscriber only prevents the caller from using the personal dial tone services of a subscriber to that service, for example specialized billing of calls to that subscriber's account instead of to the account normally associated with the line to the calling station $1_A$.

In the above discussed dial-up access example, the dial tone service was personalized for a single outgoing call by temporarily loading the subscriber's profile data into the register assigned to the outgoing call in the originating central office $11_I$. The system can provide such service to the subscriber over any line or to any telephone station, including pay telephone stations.

The present invention also enables activation of the personal dial tone service on a particular line for some predetermined period of time, for example to enable use of office or business services from some remote location while a business subscriber is out of the office. This type of operation involves an activation call requesting the service on a particular line for the desired period. Consider now an example of such a time activated service.

For this example, assume that a subscriber's normal business telephone is telephone $1_B$. The end office switch $11_N$ stores the subscriber profile data for the line associated with that telephone station. Now assume that the subscriber is using station $1_A$ connected through a telephone line to central office $11_I$ for business related communication services. The business related communication services include both incoming call related services and outgoing call related services.

To activate the personal dial tone service, the subscriber again lifts the handset at station $1_A$, receives dial tone from the central office 11, and dials the access number assigned to that service. The network uses AIN type processing to route the call to the IP 23, as in the example discussed above relative to FIG. 5.

As in the earlier examples, the IP 23 seizes the line for the incoming call and launches a query to the SCP 19 through the TCP/IP network 27. The SCP 19 transmits back a message instructing the IP 23 to play a greeting and a prompt message and collect and analyze spoken input information to identify and authenticate the subscriber. The instruction from the SCP 19 also causes the IP 23 to prompt the subscriber and obtain input information regarding the time period for service activation and possibly to obtain digits representing the subscriber's normal business telephone number. The process of calling the access number and interacting with the IP to activate the personal dial tone service on a line for the desired period is another type of service request.

For outgoing call processing, the IP 23 signals the central office $11_I$ serving the line to station $1_A$ to set an off-hook trigger in the profile data associated with that line. The IP also obtains the profile information from the switch $11_N$ serving the station $1_B$ and provides that information together with a virtual OE number to the central office $11_I$. The office $11_I$ stores the profile in its disc memory 63 in such a manner that the switch in that office can use the virtual OE number to retrieve that subscriber's profile. For subsequent incoming calls to the subscriber, the IP 23 transmits a signaling message to the subscriber's home office $11_N$ to set a terminating attempt trigger (TAT) against the line to the subscriber's office telephone $1_B$.

The IP 23 also transmits a message through the TCP/IP network 27 to the SCP 19 advising the SCP 19 of the service activation. This message identifies the subscriber, for example by their normal telephone number and identifies the telephone number and office equipment (OE) number associated with the line to station $1_A$ that the subscriber selected for their personal dial tone service.

In response to the message from the IP 23, the SCP 19 now establishes or modifies two CPRs for this subscriber. One CPR controls processing of calls to the subscriber's normal business telephone number to enable routing to the station $1_A$, and the other controls routing of outgoing calls from that station to the IP 23 for speaker identification/verification (SIV) processing.

If the associated personal identification functionality for caller ID service relies on a central database, such as LIDB, the IP would also instruct that database to temporarily establish a subscriber account record associating the subscriber's name and calling card billing information with the telephone number for station $1_A$ and a subscriber identifier code.

Subsequently, when there is an outgoing call from the station $1_A$, the network will route the call to the IP 23 to determine if the caller is the subscriber or some other party, exactly as discussed in the per-call service from a shared use line (FIGS. 4A to 4C). As in that earlier example, if the IP identifies the caller as the personal dial tone subscriber, then the IP 23 provides the virtual OE number to enable loading of subscriber's profile from disc memory 63. The network provides the telephone number and the subscriber specific information, for caller ID purposes, with ringing signals or with call waiting alert signals, as discussed above. Also, if a call comes in for the subscriber while the line is engaged with an existing call, the network provides the distinctive call waiting alert signal as discussed above relative to FIGS. 5A–5C.

On an outgoing call, if the IP determines that the caller is not the personal dial tone subscriber, the IP instructs the originating office $11_I$ to simply provide dial tone and complete the call in the normal manner. The central office $11_I$ therefore will utilize the office equipment (OE) number and profile information normally associated with the line, instead of those for the personal dial tone subscriber. The network provides caller ID service, identifying the number and possibly the main name associated with the line, in the normal manner.

The trigger set against the subscriber's normal telephone number and establishment of the CPR in the SCP 19 enables redirection of calls normally intended for the subscriber's business telephone $1_B$ to the line to station $1_A$. Depending on how the subscriber elects to define their individual service, the network may simply route the calls to the line to station $1_A$, as a normal AIN forwarded call that simply rings the station(s) $1_A$ on the line. Alternatively, the subscriber may elect an enhanced service which involves routing to the IP, IP prompting and speech recognition to identify the called subscriber and distinctive ringing over the line, in a manner analogous to that used for processing incoming calls in shared use applications, such as the above discussed dormitory example.

For incoming calls, a terminating attempt trigger is also set against the telephone number and/or normal office equipment number for the line to the station that the subscriber is temporarily using, that is to say against station $1_A$ in the present example. Calls attempts to that line, either for the normal subscriber or for the visiting personal subscriber will hit this trigger and initiate the incoming call processing of FIG. 5. If the caller selects the personal dial tone subscriber, the network processes the incoming call and provides distinctive alerting (ringing or call waiting) in accord with that subscriber's profile. However, if the caller selects the normal subscriber or goes to the default processing, the switch using the normal subscriber's regular profile as the default and provides a normal ringing or call waiting signal.

In this way, it is quite easy for the personal dial tone subscriber and the normal subscriber to both obtain their desired services on their respective calls via the same line, and to be correctly identified to called parties who subscribe to caller ID services.

As noted above, the dial-up access procedure in this latest service example required the subscriber to specify a time period that the personal dial tone service should apply to the particular line. The IP 23 stores a record of the time period elected by the subscriber. When the period expires or if the subscriber calls in earlier to change the service to another line or temporarily cancel the service, the IP 23 will provide cancellation notices to the appropriate central offices 11 and to the SCP 19. In the example, the IP 23 will notify the office $11_I$ to cancel the off-hook trigger set against the line to station $1_A$ and to delete the subscriber's virtual OE number and profile from its disc memory. The IP 23 will also instruct the central office $11_N$ to cancel the terminating attempt trigger set against the subscriber's business line to station $1_B$. The notice to the SCP 19 causes the SCP to deactivate the personal dial tone CPR and the call redirection CPR. The IP may also instruct the LIDB database to cancel the temporary subscriber account record.

The subscriber can then or later interact with the IP 23 to establish time based temporary personal dial tone service through another line or location, as discussed above. In this manner, a subscriber might set up a temporary office in a motel in one city for several days. The subscriber might cancel the service while in transit to a new location. Then the subscriber might reestablish the service to set up a temporary office service at a vacation home for a week.

The time based personal dial tone service could be modified in several manners. For example, the subscriber might establish a file for use by the SCP or the IP to establish the personal dial tone service at two or more locations at specified times, e.g. at the office during office hours and at a home office during other hours. Also, the above example of this service relied on downloading the subscriber' profile into the switch serving the line with which the subscriber is temporarily associated. Alternatively, the IP could obtain the profile from the subscriber's home switch and provide the profile to the serving switch as part of the processing of each outgoing call by the subscriber from that line during the specified time period.

A preferred network implementation and a number of specific call processing routines have been discussed above by way of examples relating to the present invention. However, the preferred embodiment of the invention is amenable to a variety of modifications.

For example, the preferred embodiment described above utilizes speaker identification/verification to recognize the identity of a calling subscriber. Where such capabilities are not available, the system could use an announcement and digit collection process, for example to obtain an account number and a personal identification number (PIN).

Also, the currently preferred embodiment utilizes AIN routing to the IP and speaker identification/verification elements within the IP to identify the subscriber for profile selection. As speaker identification/verification equipment becomes more readily available, cheaper and more compact, it will be possible to build this functionality into the line cards of the end office switches. The switch itself will challenge the caller, analyze spoken information and identify the subscriber to select the appropriate profile, without routing to an IP or the like.

Also, the call waiting alert signal used for the distinctive alerting utilized various different tone signals. As an alternative, the network could provide an announcement as the call waiting alert signal. In such a case, the announcement might positively identify the called subscriber by name or even relay a recording of the name spoken by the caller in the subscriber selection step (S311).

As shown by the above discussion, with personal dial tone service of the present invention, call waiting service is distinct or 'personal' to the called subscriber in that the alerting signal is one of several selected to uniquely identify a particular called person. The call waiting service may also be distinct or 'personal' to the caller, in that the caller ID information accompanying the call waiting alert signal includes the name of the actual person calling or a number and code uniquely identifying the caller. Personalization of these aspects of the call waiting service, in the manner described above, does not utilize additional numbers for different individuals and therefore does not consume scarce network resources. Also, the individualized call processing tends to be relatively user friendly because wherever possible the services rely on speaker authentication and/or speech recognition.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method comprising:
    detecting a call to a predetermined destination identifier associated with a plurality of known individual subscribers;
    upon detection of the call, prompting a caller and analyzing an input from the caller to identify one of the known subscribers as an individual intended as a recipient of the detected call;
    loading subscriber service profile information corresponding to the intended recipient subscriber in a call processing register of a switch serving link to a destination station, wherein the subscriber service profile information corresponds to the predetermined destination identifier and contains information corresponding to at least one of service feature information, billing information, identification information, an alerting service, and a call restriction profile; and
    transmitting a distinct one of a plurality of predetermined call alert signals over the link to the destination station, the distinct call alert signal identifying the intended recipient subscriber based on the subscriber service profile information.

2. A method as in claim 1, wherein the distinct call alert signal comprises a distinctive ringing signal.

3. A method as in claim 1, wherein the distinct call alert signal comprises a distinctive call waiting signal.

4. A method as in claim 1, wherein the predetermined destination identifier consists of a telephone number.

5. A method comprising:
    detecting a call to a predetermined destination identifier associated with a plurality of known individual subscribers;
    upon detection of the call, prompting a caller and analyzing an input from the call to identify one of the known subscribers as an individual intended as a recipient of the detected call;
    determining if a link to a destination corresponding to said destination identifier is busy; and in response to the link to the destination being busy, transmitting a distinct one of a plurality of predetermined call waiting alert signals over the link to the destination based on subscriber service profile information corresponding to the intended recipient subscriber and containing information corresponding to at least one of service feature information, billing information, identification information, an alerting service, and a call restriction profile, the distinct call waiting alert signal identifying the intended recipient subscriber.

6. A method as in claim 5, wherein the prompting comprises playing an announcement requesting the caller to speak the name of the intended recipient subscriber.

7. A method as in claim 6, wherein the analyzing comprises analyzing an audible input from the caller to recognize a spoken match to a name of one of the known subscribers.

8. A method as in claim 5, wherein the predetermined destination identifier consists of a telephone number.

9. An apparatus comprising:
a telecommunication network comprising a plurality of central office switching systems interconnected by trunk circuits, for processing calls originated over a plurality of communication links, at least one of said central office switching systems including mass storage containing subscriber service profiles, each subscriber service profile corresponding to an intended recipient subscriber and containing information corresponding to at least one of service feature information, billing information, identification information, an alerting service, and a call restriction profile; and
a platform, coupled via a communication link to one of the central office switching systems, for providing a message to a caller and receiving an input from the caller; wherein:
in response to a call to a predetermined destination identifier associated with a plurality of known individual subscribers, the telecommunication network routes the call to the platform,
the platform prompts a caller and analyzes an input from the caller to identify one of the known subscribers as an individual intended as a recipient of the detected call and provides a code corresponding to the subscriber identified as the intended recipient to a central office switching system serving a communication link corresponding to said destination identifier, and
the central office switching system serving the communication link utilizes the subscriber service profile information from the mass storage corresponding to the intended recipient subscriber to process the call and transmit a distinct one of a plurality of predetermined call alert signals over the link to the destination station, the distinct call alert signal identifying the intended recipient subscriber.

10. An apparatus as in claim 9, wherein the central office switching system serving the communication link transmits one of a plurality of distinctive ringing signals as the distinct call alert signal.

11. An apparatus as in claim 9, wherein the central office switching system serving the communication link transmits one of a plurality of distinctive call waiting signals as the distinct call alert signal.

12. An apparatus as in claim 9, wherein the platform comprises a speech recognition module for analyzing an audible input from the caller to recognize a spoken match to a name of one of the known subscribers.

13. An apparatus as in claim 12, wherein the platform further comprises a voice authentication module for analyzing speech of a caller to identify the caller as a particular known subscriber.

14. An apparatus as in claim 9, wherein:
the telecommunication network comprises a public switched telephone network;
the central office switching systems comprise program controlled telephone switches; and
the platform comprises an intelligent peripheral coupled to at least one of the telephone switches.

15. An apparatus as in claim 14, wherein the telephone network further comprises:
an interoffice signaling network interconnecting the telephone switches; and
a service control point coupled to the interoffice signaling network and storing call processing information for control of at least some of the call processing operations of the telephone switches.

16. A telecommunication network comprising:
a telephone central office switching system for processing calls originated over a plurality of telephone links; and
a peripheral coupled via a telephone link to the switching system, said peripheral including a speech recognition module for analyzing speech of a caller from a first communication link to identify one of a plurality of subscribers as an intended recipient and provide a control code assigned to the identified subscriber to the switching system, the control code being based on subscriber service profile information corresponding to the intended recipient subscriber and containing information corresponding to at least one of service feature information, billing information, identification information, an alerting service, and a call restriction profile.
wherein in response to the control code, the switching system processes a waiting call from the first telephone link to a second telephone link associated with the identified subscriber and transmits a distinct one of a plurality of predetermined call waiting alert signals over an established call connection on the second link, the distinct call waiting alert signal corresponding to the intended recipient subscriber.

17. A network as in claim 16, further comprising:
a service control point, remote from the telephone switching system, said service control point containing a database of call processing records for providing instructions to the telephone central office switching system; and
a first signaling network separate from the telephone links for carrying signaling messages between the service control point and the telephone switching system.

18. A network as in claim 16, wherein:
the telephone central office switching system includes mass storage containing subscriber profiles, and
in response to the code, the switching retrieves a subscriber profile corresponding to the intended recipient subscriber which identifies the distinct call waiting alert signal for transmission over the second telephone link.

19. A method comprising:
detecting a request to make a call from a predetermined link through a multiple link communication network;
receiving and processing speech signals from a person via the predetermined link to identify the person as one of a plurality of subscribers to services offered through the communication network;

instructing a switching office of the communication network to utilize profile data corresponding to the identified subscriber for processing of the call from the predetermined link through the network to a destination station;

determining if a link to the destination station is busy, and if so, transmitting a call waiting alerting signal over the link to the destination station; and transmitting subscriber service profile information representing the identity of the one subscriber to the destination station together with the alerting signal, the subscriber service profile information containing information corresponding to at least one of service feature information, billing information, identification information, an alerting service, and a call restriction profile.

20. A method as in claim 19, wherein the step of receiving and processing speech signals comprises:

receiving signals from the person over the predetermined link, and comparing information characteristic of the received speech signals to stored speech data corresponding to a plurality of subscribers associated with the predetermined link.

21. A method as in claim 19, wherein the communication network comprises a telephone network having a plurality of central offices each of which serves a plurality of communication links.

22. A method as in claim 19, wherein the step of transmitting data comprises transmitting data representing a name of the one subscriber from the profile data through the communication network to the destination station.

23. A method as in claim 19, wherein the step of transmitting data comprises:

transmitting data representing the identity of the one subscriber to a database remote from the switching office;

accessing information in the remote database to translate the data representing the identity of the one subscriber into data representing the name of the one subscriber; and transmitting the data representing the name of the one subscriber to the destination station.

24. A method comprising:

detecting a call to a predetermined destination identifier associated with a plurality of known individual subscribers;

upon detection of the call, analyzing an input from a caller to identify one of the known subscribers as an individual intended as a recipient of the detected call;

loading subscriber service profile information corresponding to the intended recipient subscriber in a call processing register of a switch serving a link to a destination station corresponding to the predetermined destination identifier, wherein the subscriber service profile information contains information corresponding to at least one of service feature information, billing information, identification information, an alerting service, and a call restriction profile, wherein the step of loading comprises:

(a) selecting an office equipment number corresponding to the intended recipient subscriber;

(b) retrieving the subscriber profile information corresponding to the office equipment of the intended recipient subscriber from mass storage; and (c) loading the retrieved subscriber profile information into the call processing register of the switch; and transmitting a distinct one of a plurality of predetermined call alert signals over the link to the destination station, the distinct call alert signal identifying the intended recipient subscriber.

25. A telecommunication network comprising:

a plurality of central offices interconnected by trunk circuits for processing calls originated over a plurality of communication links;

storage containing subscriber service profiles, each subscriber service profile corresponding to an intended recipient subscriber and containing information corresponding to at least one of service feature information, billing information, identification information, an alerting service, and a call restriction profile; and a peripheral coupled to one of the central offices for receiving an input from a caller, to identify one of a plurality of subscribers as an intended recipient and provide an office equipment number assigned to the identified subscriber to the one central office, wherein:

the one central office retrieves a profile corresponding to the office equipment number assigned to the identified subscriber from storage, wherein the one central office processes a waiting call from the first communication link to a second communication link of the network associated with the identified subscriber using the retrieved profile, and the processing of the waiting call includes transmitting a distinct one of a plurality of predetermined call waiting alert signals over an established call connection on the second link, the distinct call waiting alert signal corresponding to the intended recipient subscriber.

26. A method comprising:

detecting a call to a predetermined destination identifier associated with a plurality of known individual subscribers;

upon detection of the call, analyzing an input from a caller to identify one of the known subscribers as an individual intended as a recipient of the detected call;

using an office equipment number assigned individually to the intended recipient subscriber to obtain a subscriber profile record associated with the intended recipient subscriber, from among records of a plurality of subscribers, the subscriber profile record containing information corresponding to at least one of service feature information, billing information, identification information, an alerting service, and a call restriction profile;

determining if a link to a destination corresponding to said destination identifier is busy; and upon the link to the destination being busy, and based at least in part on information from the obtained subscriber profile record, transmitting a distinct one of a plurality of predetermined call waiting alert signals over the link to the destination, wherein the distinct call waiting alert signal identifies the intended recipient subscriber.

* * * * *